United States Patent
Ernest et al.

(10) Patent No.: US 11,580,358 B1
(45) Date of Patent: Feb. 14, 2023

(54) OPTIMIZATION WITH BEHAVIORAL EVALUATION AND RULE BASE COVERAGE

(71) Applicant: Thales, S.A, Courbevoie (FR)

(72) Inventors: Nicholas Ernest, Cincinnati, OH (US); Timothy Arnett, Cincinnati, OH (US); Brandon Kunkel, Cincinnati, OH (US)

(73) Assignee: Thales, S.A., Courbevoie (FR)

( * ) Notice: Subject to any disclaimer, the term of this patent is extended or adjusted under 35 U.S.C. 154(b) by 364 days.

(21) Appl. No.: 15/930,388

(22) Filed: May 12, 2020

(51) Int. Cl.
*G06N 3/04* (2006.01)
*G06N 5/04* (2006.01)
*G06N 5/048* (2023.01)
*G06N 7/02* (2006.01)

(52) U.S. Cl.
CPC .......... *G06N 3/0436* (2013.01); *G06N 5/048* (2013.01); *G06N 7/02* (2013.01)

(58) Field of Classification Search
CPC .............. G06N 3/04; G06N 5/04; G06N 5/02
USPC .......................................................... 705/5
See application file for complete search history.

(56) References Cited

U.S. PATENT DOCUMENTS

| | | |
|---|---|---|
| 5,774,630 A | 6/1998 | Lee et al. |
| 6,067,496 A | 5/2000 | Benoliel et al. |
| 6,411,944 B1 | 6/2002 | Ulyanov |
| 6,430,544 B1 | 8/2002 | Childress |
| 6,549,830 B2 | 4/2003 | Harada et al. |
| 6,735,576 B1 | 5/2004 | Kaji et al. |
| 6,748,574 B2 | 6/2004 | Sasagawa et al. |
| 6,895,286 B2 | 5/2005 | Kaji et al. |
| 7,251,638 B2 | 7/2007 | Fujii et al. |
| 7,437,336 B2 | 10/2008 | Grefenstette |
| 7,444,309 B2 | 10/2008 | Branke et al. |
| 9,077,491 B2 | 7/2015 | Mar et al. |
| 10,248,675 B2 | 4/2019 | Birdwell et al. |
| 10,489,713 B1 | 11/2019 | Ernest |
| 2001/0044661 A1 | 11/2001 | Kaji et al. |
| 2001/0051476 A1 | 12/2001 | Harada et al. |
| 2002/0133797 A1 | 9/2002 | Sasagawa et al. |
| 2004/0077090 A1 | 4/2004 | Short |
| 2004/0210545 A1 | 10/2004 | Branke et al. |
| 2005/0038762 A1 | 2/2005 | Grefenstette |
| 2005/0197994 A1 | 9/2005 | Fujii et al. |
| 2006/0293817 A1 | 12/2006 | Hagiwara et al. |
| 2009/0210366 A1 | 8/2009 | Sakata et al. |

(Continued)

OTHER PUBLICATIONS

Brehm, T., et al., "Hybrid Fuzzy Logic PIDS Controller," Dept. of Electrical Engineering, Wright State University, Dayton, OH, Jul. 1994, 11 pgs.

(Continued)

*Primary Examiner* — Nga B Nguyen
(74) *Attorney, Agent, or Firm* — Frost Brown Todd LLP

(57) ABSTRACT

The present disclosure describes improvements in optimization systems. During an optimization loop, an advanced objective function is used to determine an objective value, a specification metric, and a rule coverage metric for a particular solution. The specification metric characterizes compliance of the solution with certain formal specifications. The rule coverage metric characterizes the degree to which all rules (or a particular rule) are tested during testing of the system. The objective value and metrics may influence future operation of the optimization loop.

17 Claims, 13 Drawing Sheets

(56) References Cited

U.S. PATENT DOCUMENTS

| | | | |
|---|---|---|---|
| 2012/0053970 A1 | 3/2012 | Bhamidipaty et al. | |
| 2014/0087749 A1 | 3/2014 | Mar et al. | |
| 2015/0106316 A1 | 4/2015 | Birdwell et al. | |
| 2015/0185716 A1* | 7/2015 | Wichmann | F02C 9/28 700/287 |
| 2016/0042294 A1* | 2/2016 | Macready | G06N 5/02 706/10 |
| 2017/0161612 A1* | 6/2017 | Hastings | G06F 30/00 |
| 2017/0278008 A1 | 9/2017 | Clark et al. | |
| 2017/0364043 A1* | 12/2017 | Ganti | G05B 17/02 |
| 2019/0312800 A1* | 10/2019 | Schibler | H04L 41/0823 |

OTHER PUBLICATIONS

Chen, P. et al. "A fuzzy genetic algorithm for QoS multicast routing". Computer Communications, vol. 26, Issue 6, Apr. 15, 2003, pp. 506-512.

Clark, Matthew A., et al., Poster: Hybrid Representation of Rule-Based Systems, Poster; Conference, Apr. 14-16, 2015, pp. 287-288, HSCC'15, Seattle, Washington.

Ernest, N.D., "Genetic Fuzzy Trees for Intelligent Control of Unmanned Combat Aerial Vehicles," Dissertation, College of Engineering and Applied Science, University of Cincinnati, Mar. 2015, 151 pgs.

Herrera, F. et al. "Adaptation of genetic algorithm parameters based on fuzzy logic controllers." Genetic Algorithms and Soft Computing 8 (1996): 95-125.

Liu, H. et al. "Hybrid fuzzy-genetic algorithm approach for crew grouping." 5th International Conference on Intelligent Systems Design and Applications (ISDA'05). IEEE, 2005. 6 pages.

Mathworks Global Optimization Toolbox, Matlab® programming language, Mar. 9, 2015, downloaded from http://www.mathworks.com/help/gads/index.html, Jun. 5, 2018, 14 pgs.

Rattan, K.S., et al., "Design and Analysis of a Multistage Fuzzy PID Controller," 2015 American Control Conference, Jul. 1-3, 2015 Chicago, IL, USA, pp. 5726-5731, 6 pgs.

Rattan, K.S., et al., "KM-LOGIC: A Computationally Efficient, Real-Time MIMO Fuzzy Inference System," Air Force Research Laboratory, Wright-Patterson AFB, Ohio, 2015, 26 pgs.

Sarma, K.C. "Fuzzy discrete multicriteria cost optimization of steel structures using genetic algorithm". Diss. The Ohio State University, 2001. 275 pages.

Sharma, S.K. et al. "Genetic evolution: A dynamic fuzzy approach." Ninth IEEE International Conference on Fuzzy Systems. FUZZ-IEEE 2000 (Cat. No. OOCH37063). vol. 2. IEEE, 2000.

Valdez, F. et al. "Modular neural networks architecture optimization with a new nature inspired method using a fuzzy combination of particle swarm optimization and genetic algorithms." Information Sciences 270 (2014): 143-153.

Voget, S. et al. "Multidimensional optimization with a fuzzy genetic algorithm." Journal of Heuristics 4.3 (1998): 221-244.

Ward Systems Group, Inc., GeneHunter, 2007, downloaded from http://www.wardsystems.com/genehunter.asp, Jun. 5, 2018, 11 pgs.

Watanabe, H. et al. "A VLSI Fuzzy Logic Controller with Reconfigurable, Cascadable Architecture". IEEE Journal of solid-state circuits 25.2 (1990): 376-382.

U.S. Appl. No. 62/209,937, filed Aug. 26, 2015.

U.S. Appl. No. 16/693,892, entitled "Self-Optimized System and Method Using a Fuzzy Genetic Algorithm," filed Nov. 25, 2019.

* cited by examiner

| | | | | |
|---|---|---|---|---|
| $U_{1,1}$ | $U_{1,2}$ | $U_{1,3}$ | $U_{1,4}$ | $U_{1,5}$ |
| $U_{2,1}$ | $U_{2,2}$ | $U_{2,3}$ | $U_{2,4}$ | $U_{2,5}$ |
| $U_{3,1}$ | $U_{3,2}$ | $U_{3,3}$ | $U_{3,4}$ | $U_{3,5}$ |
| $U_{4,1}$ | $U_{4,2}$ | $U_{4,3}$ | $U_{4,4}$ | $U_{4,5}$ |
| $U_{5,1}$ | $U_{5,2}$ | $U_{5,3}$ | $U_{5,4}$ | $U_{5,5}$ |

OPTIMIZATION WITH BEHAVIORAL EVALUATION AND RULE BASE COVERAGE

CROSS-REFERENCE TO RELATED APPLICATIONS

The content of this application is related to that of U.S. Provisional Patent Application 62/209,937, filed Aug. 26, 2015; U.S. patent application Ser. No. 15/248,638, filed Aug. 26, 2016; U.S. patent application Ser. No. 16/693,892, filed Nov. 25, 2019; and applications filed by the present applicant on even date herewith with titles "Multidimensional Encoding of Genetic Algorithms" and "Fuzzy Logic System with Non-Iterative Search"; and each of these is hereby incorporated by reference as if set forth in its entirety.

FIELD

The present systems and methods relate to computer systems based on specific computational models. More specifically, the present systems and methods relate to computer systems that use fuzzy logic to improve the functioning of the computer itself.

BACKGROUND

Neural networks are typically mathematics-intense methods of intelligently solving complex problems. Fuzzy control systems, in contrast, rely on expert knowledge to categorize the values of the inputs and outputs into groups and then apply if-then rules to the combinations of these input and output groups to effectively replace the math in the problem with expert knowledge. This practice discretizes the control solution space into a range of possible linguistic terms and their combinations. There are many optimization techniques which can be utilized to automate the creation of these fuzzy control systems, and if a search heuristic such as a genetic algorithm (GA) is implemented with this fuzzy solution space, reliance on humans to apply expert knowledge to the problem-solving can be reduced or eliminated.

For many optimization techniques, an objective function is required. This function dictates the relative fitness, or quality, of a solution for the algorithm to compare against alternative solutions. Example objective functions include analyzing how accurately predictions fit to data or determining overall performance of a controller through a simulation.

A multitude of GA software implementations exist. Some implementations are the GA implemented in MATHWORKS' Global Optimization Toolbox for the MATLAB programming language (mathworks.com/help/gads/index-.html) and Ward Systems Group's GENEHUNTER (ward-systems.com/genehunter.asp). Many non-commercial or proprietary implementations have been written in many different languages, each with its own built-in feature set. GAs can be effective in solving problems that have many local optima, or values that are better than similar solutions, but not quite the optimal, or best over the whole solution space. The types of problems GAs are employed to solve may have relatively simple fitness functions, but even in such cases GAs can have scalability issues when the complexity of each chromosome or organism becomes quite high.

One issue that can contribute to the difficulty of scalability and optimization of GFSs include an inability to influence or verify the effectiveness of GAs during evolution, and so in some cases populations may be produced that are later determined to be undesirable or ineffective in advancing towards an optimized solution. Another issue that can contribute to the production of undesirable populations is reliance upon a poor set of inputs for post-generation verification of the effectiveness of a population. Where input data, referred to as training sets, are incomplete or do not contain sufficiently diverse data the results of verification may be misleading and may result in desirable traits being culled from a population, or undesirable traits being passed on to future generations. As a result, the time needed to arrive at an optimized solution may be increased and the extent of optimization may be limited.

BRIEF DESCRIPTION OF THE DRAWINGS

FIG. 11 is a schematic diagram illustrating an exemplary rule base;

FIG. 12 is a schematic diagram illustrating rule coverage of the rule base of FIG. 11, where the variety of patterns in various cells indicate different shading;

DESCRIPTION

Figure 1:
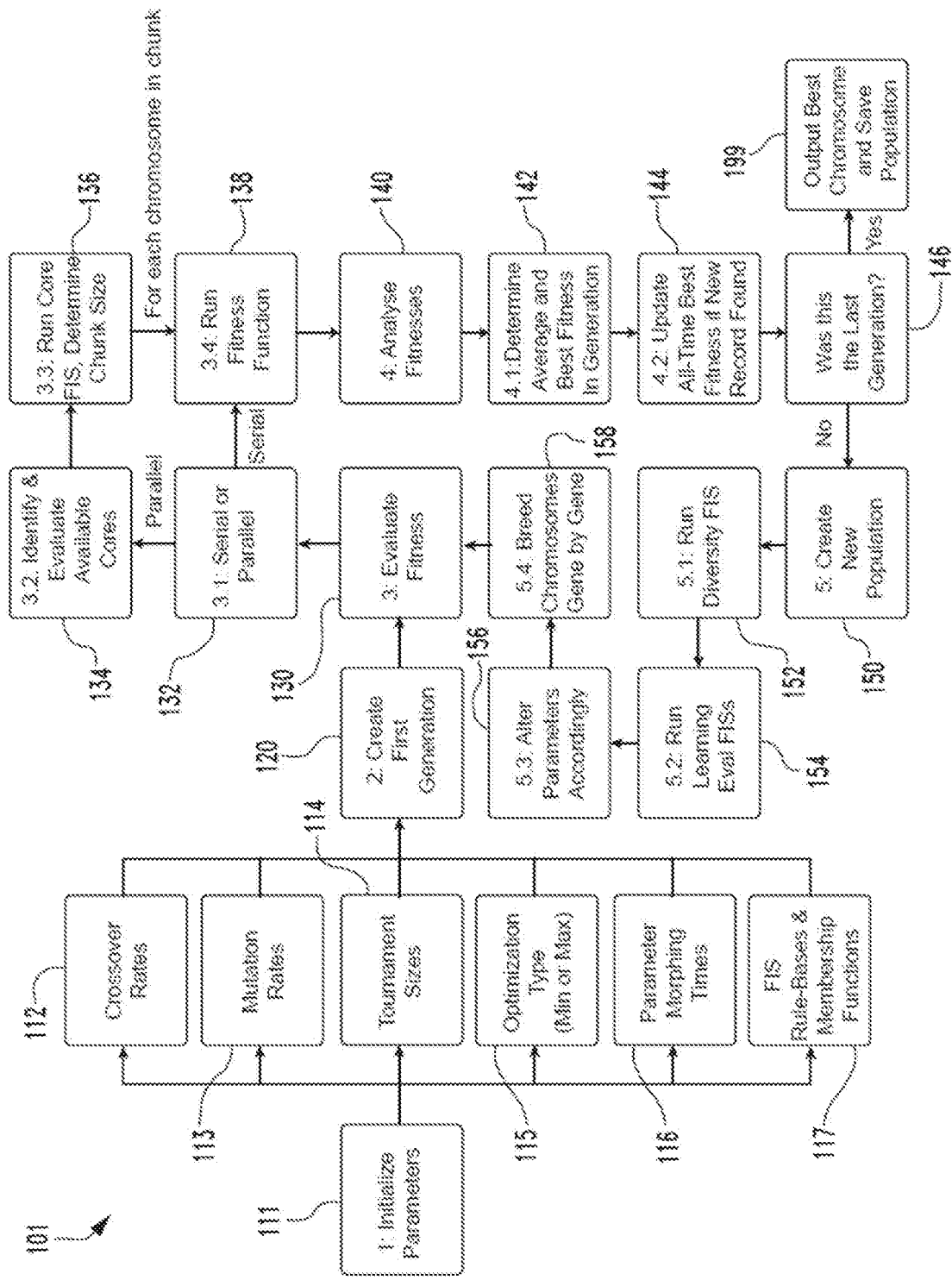
FIG. 1 is a flowchart illustrating internal operation of a first implementation of a GFT-optimized GA.

For the purpose of promoting an understanding of the principles of the present invention, reference will now be made to the embodiment(s) illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

This disclosure relates to an improved computing system for iterative optimization of functional systems across a broad solution space, and applications thereof. When used herein, a functional system may refer to a software system that embodies and/or evaluates mathematical functions, logical functions, or other functional procedures, and that may receive various inputs and determine and provide or return various corresponding outputs. Functional systems may include, for example, control systems, analytics systems, fuzzy logic systems, neural networks, GFS, Fuzzy Inference Systems (FISs), and other systems as may be disclosed herein or as will be apparent to those of ordinary skill in the art based on this disclosure. Optimization of functional systems may include, for example, a conventional implementation of a GFS, where a GA creates and optimizes a FIS, or a controller based on fuzzy control. Each chromosome in this GA defines a FIS, and the FIS it defines must be evaluated to evaluate its fitness, or suitability for its intended purpose. As the number of inputs and outputs used during evaluation increase, the complexity of the FIS increases exponentially, and thus standard GAs quickly become computationally intractable. By providing a more scalable approach, the present methodology allows a similar solution to be applied to incredibly complex problems, with hundreds or even thousands of inputs and outputs. During the optimization process, rather than simply looking at metrics of performance of the system to the given data or simulation test, we propose to additionally analyze the overall utilization of the FIS(s) rule-base(s). By tracking the amount of times each if-then rule within the rule-base(s) is activated, different metrics of optimization thoroughness can be obtained. This can be fed into the objective function by additional parameters, improving the overall robustness of the system. These types of fuzzy inference systems (FISs) can be formally verified through model checkers and theorem provers. This capability provides a mathematic proof of adherence of the FIS or FISs to a given specification, or it allows the system to find a counterexample where adherence is proven false. This capability has immense importance, especially in the case of FIS(s) utilized in safety-critical systems.

Typically, formal verification occurs after completion of the optimization process and is a manual process to ensure adherence to the specifications. However, including formal verification tests in the objective function during the optimization process provides additional information to the optimization algorithm. Beyond simply automating the formal verification work, this effectively reduces the overall optimization time by enabling additional bias for the search algorithm within specification-compliant regions.

I. Exemplary Context

While the present disclosure can be applied in the context of many iterative optimization systems, certain embodiments perform especially well in tiered GFT implementations, as described in U.S. Pat. No. 10,489,713, issued Nov. 26, 2019, and titled "Self-Optimized System and Method Using a Fuzzy Genetic Algorithm," the entirety of which is incorporated herein by reference. In some exemplary implementations of such systems, a GFT may serve as the GA for another GA-optimized system, which may itself include a separate GFT. That is, the higher-level GFT manages the parameters for the GA (which might be another, lower-level GFT).

As an example of the above, FIG. 1 illustrates operation of a higher-level GFT (101). The system initializes (block 111) its adjustable parameters, which may be preconfigured or may be automatically determined by operation and optimization of another GA. In some implementations, crossover rates (block 112), mutation rates (block 113), tournament sizes (block 114), and parameter morphing times (block 116) are all arrays of length 10 by default, with the system using the sequence of values in each array as the generations proceed.

The crossover rate (block 112) for a given generation dictates the odds of two chromosomes, once selected for breeding, successfully creating an offspring. The mutation rate (block 113) for a generation similarly represents the odds of a chromosome undergoing a mutation, or structured change to its own chromosome, during breeding. This may include using tournament-style polling, where a number of chromosomes are selected from the generation at random, and the chromosome in this selection with the highest fitness is chosen for breeding. Other implementations will use different polling techniques as will occur to those skilled in the art.

In implementations using tournament-style polling, tournament size (block 114) is the percentage of the population size that is randomly polled for each tournament for a given generation. Normally in GAs these values are static, but implementations disclosed herein may use different parameters through the run, dictated by the parameter morphing times array (block 116), which lists at what generation or at what proportion of the maximum number of generations one or more of these parameters change to their next value.

The optimization type parameter (block 115) in this embodiment describes whether the system should seek to minimize or maximize the fitness scores, though other embodiments might implement more complex optimization types as will occur to those skilled in the relevant art in view of this disclosure.

An FIS may also be configured as part of initialization of the optimization system, and it may comprise a fuzzy tree (block 117). The if-then rule bases and the position and shape (e.g., triangular or trapezoidal) of the membership functions used in the FIS are defined in this configuration as well.

Creation of the first generation's population (block 120) may then occur, which may include seeding certain genes into the population. For example, if the operator is applying GFT (101) to a fuzzy system of some sort and strongly believes, but cannot guarantee, that a particular if-then rule could be optimal, this rule could be seeded in the population rather than hardcoded in the fuzzy system, which may reduce training time.

The system may then begin (block 130) a process to intelligently use parallel resources, whether they be a single- or multi-core CPU, or a LAN- or WAN-based distributed computing cluster. The system polls for the number of CPUs available to determine whether the fitness function can be run in parallel (block 132). The system evaluates the CPUs at its disposal (block 134), including those aboard the system's server and those of any connected clients. A client may be configured by executing a script or other process that connects to the system and provides a description of CPUs that can be accessed by the system and system specifications (e.g., CPU processing speeds, RAM and other memory availability, GPU processing speeds).

Figure 2:
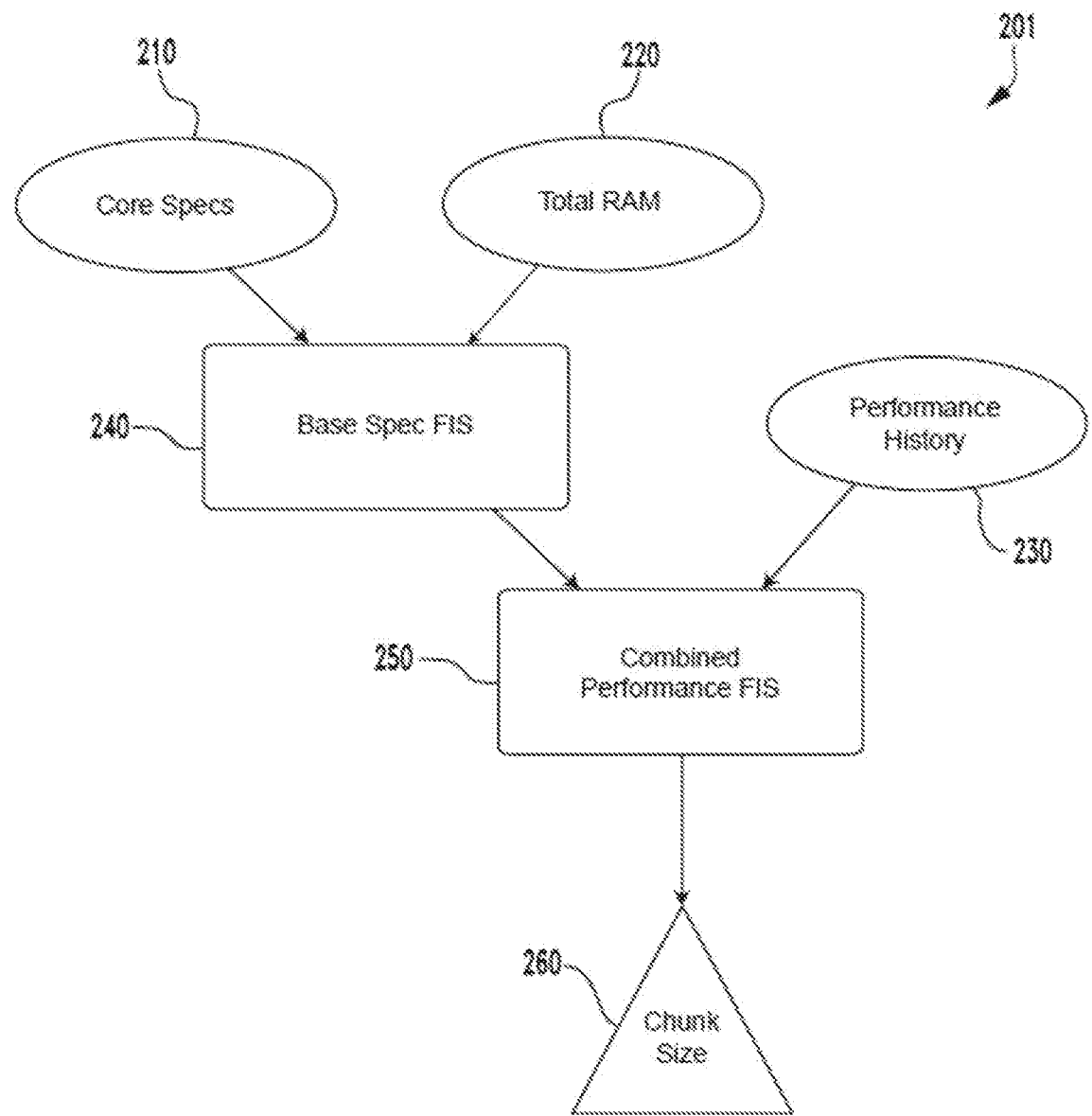
FIG. 2 is a flowchart illustrating a core FIS for determining chunk size in the system of FIG. 1.

The system then determines chromosome chunk sizes (block 136) for each available processor, which is shown in more detail in FIG. 2. This portion (201) of the system's fuzzy tree takes information such as the base core specifications (210) and RAM specifications (220) of a client and provides an intermediate capacity evaluation through base specification FIS (240). This intermediate capacity evaluation is combined with the core's performance history (230) over one or more past generations by combined performance FIS (250), which outputs the relative chunk size (260) that the system will assign to that client.

Each chunk contains a set number of chromosomes to evaluate through the fitness function and then return back corresponding fitness values. The overarching goal of combined performance FIS (250) is to intelligently assign the chromosomes so that all of the chunks finish processing at close to the same time, thus reducing the overall computational clock time for evaluating each generation.

Returning to FIG. 1, fitness is analyzed (block 140), and after each fitness value is found, the average and best fitness scores are found for that generation (block 142). If that generation's best fitness is better than the previous best fitness found throughout all generations, that best-fitness value is updated (block 144). The changes in best and generational-average fitness values may be recorded over a rolling window of generations (e.g., five generations). If this was the last generation (block 146), the GA loop ends here and outputs the best chromosome and its fitness, as well as data describing the last population (block 199), which may be used to further train the system at a later date or as a backup data in the event of an error.

Where further generations are to be determined, the system begins (block 150) a further process of high-level GFT (101) creates the new population for the next generation (e.g., using tournament-style polling or other processes as may occur to those skilled in the art). Polling size may be determined as a function of the number of the generation, the initial parameters, the crossover rate, and the mutation rate, for example.

A diversity FIS (block 150) may be executed (block 152) to determine diversity (e.g., a measure of average differences) amongst chromosomes. In other embodiments, a variety of diversity metrics and scales may be applied here, or even none at all, as will occur to those having ordinary skill in the art in view of this disclosure. The determined diversity may be provided to the learning evaluation FISs (block 154) to determine changes to the mutation rate (block 113), crossover rate (block 112), tournament size (block 114), and other parameters. These changes may then be applied (block 156), which can drastically increase the performance of continued training by altering predefined parameters instead of defining new parameters.

Reproduction by breeding chromosomes gene-by-gene (block 158) may then occur to produce an entirely new population in every generation. A chromosome, when selected for breeding, goes through crossover and mutation gene by gene, where the exact mechanisms of the breeding type depend on the possible values the gene can take, as will be understood by those of ordinary skill in the art. This high-level GFT (101) continues until a new generation is created, and then the new population goes back to a step of evaluation (block 130) to repeat the process.

Figure 3:
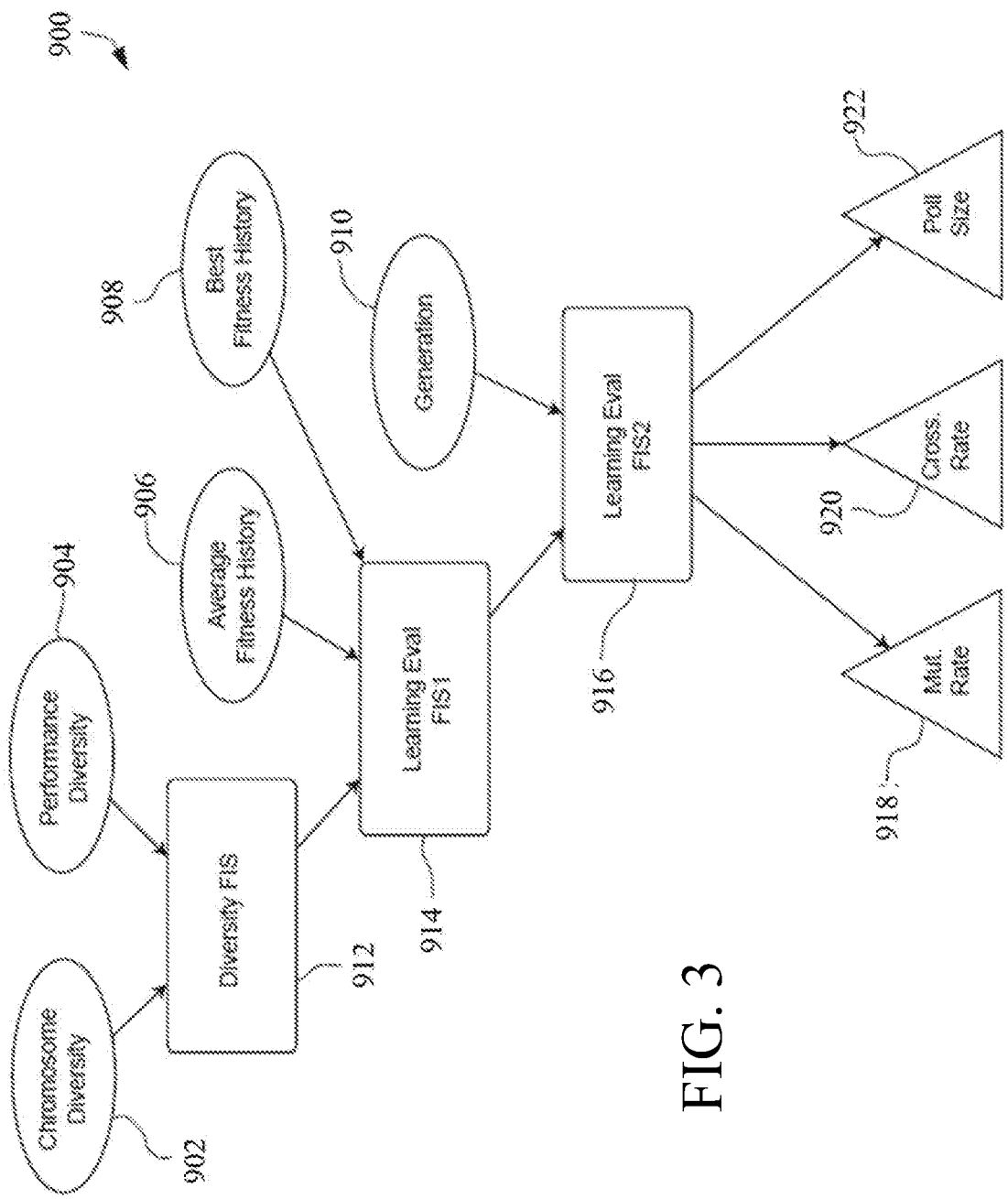
FIG. 3 is a flowchart illustrating an exemplary set of steps that may be performed to customize parameters for an underlying GA.

In some implementations of the high-level GFT (101), the higher-level GFT 101 may create a new population (block 150) using a Fuzzy Tree (900) such as that illustrated in FIG. 3. In such implementations, the diversity FIS is first run (block 912), taking the diversity measurements of both the chromosomes themselves (block 902) as well as their respective fitness values (block 904). In this illustrated embodiment, diversity is a measure of average differences, where 0 means every element is exactly the same, and 1 means that every element is different. In other embodiments, a variety of diversity metrics and scales may be applied here as will occur to those having ordinary skill in the art in view of this disclosure. Especially for certain problems, chromosomes could be radically different, but have very similar performances, which is why both measures may be included in the feedback for some FISs. Diversity may contribute to providing effective and meaningful results from breeding, and to avoiding the many undesirable local optima that are prominent in these types of problems.

The output of diversity FIS (block 912) feeds the learning evaluation FISs (block 154), the first of which, learning evaluation FIS 1 (block 914), takes the diversity output and the average (block 906) and best (block 908) fitness histories over all or a certain number of previous generations. The output of learning evaluation FIS 1 (block 914) goes on to the final FIS in this branch of the fuzzy tree, learning evaluation FIS 2 (block 916), as well as the number (block 910) of this generation, in this case normalized between 0 and 1, where 0 corresponds to the first generation, and 1 corresponds to the last. The outputs that may be implemented (block 156) are, for example, the change to the mutation rate (block 918), change to the crossover rate (block 920), and the change to tournament polling size (block 922). This is because, in the present embodiment, altering a predefined parameter is much more computationally efficient than creating a parameter. In many embodiments, this process drastically increases the performance of the present embodiment compared to a GA, and it does so in an unbiased manner, minimizing presumptions regarding the solution space of the system that the optimization system is optimizing.

Figure 4:
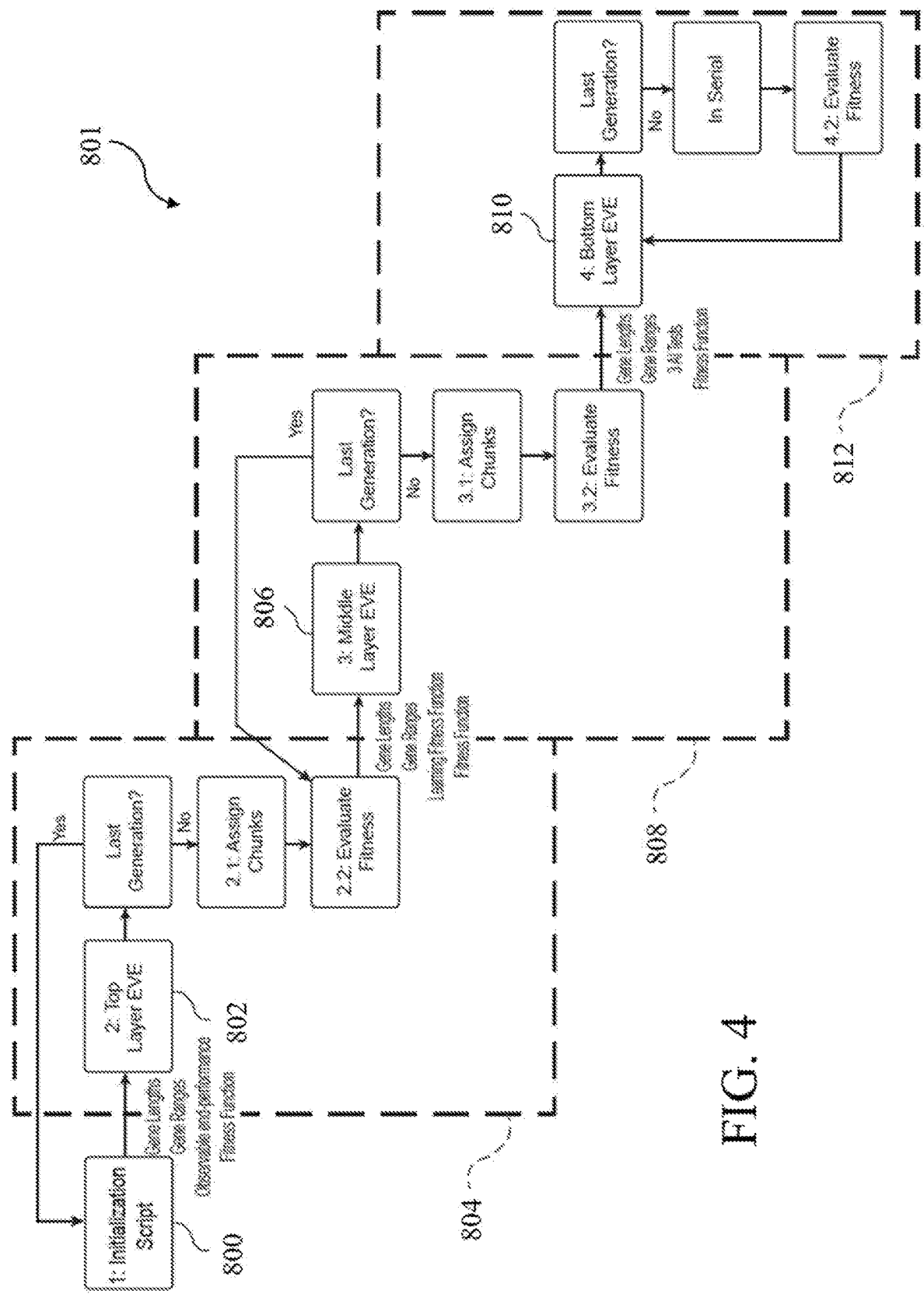
FIG. 4 is a flowchart illustrating a double-recursive self-optimizing process of the system of FIG. 1.

In some implementations of the high level GFT (101), the GFT may run recursively with little or no human intervention, resulting in a GFT system that learns to evaluate how well another GFT system was learning, an example of which is shown in FIG. 4.

Through this process (801), the top-layer GFT subsystem (804), including GFT (802), is initialized with parameters from initialization script (800) defining the gene lengths, ranges, and a fitness function, which in this embodiment is simply the best score obtained by GFT subsystem (808) over a set number of generations on the tests provided. These genes change the fitness function of the middle-layer GFT (806), editing what GFT (806) values as it determines "What is good learning and what is bad learning ability?" An example fitness function for GFT (806) is shown in Table 1.

TABLE 1

Example Fitness Function

Fitness =
 $Gain_1$ * (Best Fitness Found from GFT (806) runs) +
 $Gain_2$ * ((Best Fitness * Generation Number where Best
 Fitness was Found)/Number of total generations) +
 $Gain_3$ * Sum(Best Fitness - Average Fitness of each
 generation)

The gains here ($Gain_1$, $Gain_2$, and $Gain_3$) are what the top-layer GFT (802) determines. The first term corresponds simply to the best value middle-layer GFT (806) was able to find for the ultimate fitness function (in this example, solving the AI sample problems), weighted by coefficient $Gain_1$. The second term factors this best fitness value in with an optimization for finding this best solution in as few generations as possible (that is, speed of convergence), weighted by coefficient $Gain_2$. The third term is a weighted measure of performance diversity in the population at every generation.

Top-layer GFT subsystem (804) then calls the middle-layer GFT subsystem (808), including middle-layer GFT (806), providing this "learning evaluation" fitness function created by interpreting the genes in the top layer's (GFT subsystem (804)'s) chromosome, as well as gene lengths and ranges corresponding to variables in the primary problem definition (e.g., the Traveling Salesman Problem, Ackley Function, Levi Function, Knapsack Problem, or real-world control system context). In this example embodiment, the fitness function here in the middle-layer GFT subsystem (808) is the combined score in minimizing the first three of these functions. In this embodiment, training is limited in terms of the number of generations, such that the bottom-layer GFT (810) in bottom-layer GFT subsystem (812) must find the optimal solution to all three of the sample problems in a very limited time. In other implementations, different exit criteria are defined (and, perhaps, controlled by the upper-layer GFTs).

This system (801) from FIG. 4 outputs an optimized fitness function for the GFT to evaluate how well the lower-level GFT (810) is learning. This fitness function can then be used in the system described in connection with FIGS. 1-3, where the GFT is only run recursively once, evaluating how well each chromosome, defining a combination of all initial parameters and FIS rule bases and membership functions, performs in learning the solution to the three AI tests. This ability can be used for testing additional features and can be continuously updated with additional sample problems to further refine the learning capabilities of the overall system.

II. Objective Function with Specification Evaluation

Systems that may be configured to optimize other systems using genetic algorithms, such as the above-described GFT, neural networks, and other functional systems, may execute functions that evaluate or analyze potential solutions as they are generated during evolution of a new generation of potential solutions (in GA parlance, individuals). Such functions have been referred to herein as fitness functions, and may also be referred to as objective functions. An objective function may be expressed as a mathematical function or procedural function that receives a set of inputs and provides output that evaluates or scores the set of inputs based on some objective.

An example may be provided in the context of the "knapsack problem," a well-known problem that defines a knapsack having a maximum capacity in mass and a variety of objects that may be placed in the knapsack, each having their own value and mass. An optimal solution to the knapsack problem will maximize the value of objects placed into the knapsack while not exceeding the maximum capacity. An objective function for the two-variable knapsack problem would, for each possible solution provided as input, total the value and mass of objects in the knapsack and then return as its output the total value of objects or, in the case of the mass exceeding the capacity, a zero or negative value.

Execution of the objective function seems trivial in the above example, even with 10-20 objects (e.g., $2^{10}$ to $2^{20}$ potential solutions). In such an example, a moderately powerful processor could score each possible solution with an appropriate objective function and identify the optimal solution in a trivial amount of time (e.g., seconds or fractions of a second). However, it should be noted that each additional object that could be added to the knapsack doubles the number of possible solutions and exponentially increases the amount of time required to score all possible solutions. Adding additional input variables also increases the number of potential solutions exponentially. As an example, were the knapsack problem to instead assume 20 objects of varying value and mass, as well as 20 knapsacks having a varying cost and capacity, the number of possible solutions for maximizing net-value would increase from around a million to nearly 3.5 billion.

The use of genetic algorithms can avoid this brute-force approach to solving for an optimal solution and drastically reduce the number of potential solutions that must be scored by the objective function. GA systems such as those described herein (e.g., GFS, GFT) can still provide optimal or near-optimal solutions in a reasonable amount of time even where there are hundreds or even thousands of input variables.

In numerical optimization algorithms such as may be used with GAs, GFSs, and GFTs, an objective function may be used to assign a value to each solution reached. This objective function is used as a discriminator for selecting solutions that perform better than others, where "better" is defined according to the context as will occur to those skilled in the art. In cases where better solutions are found incrementally, the objective function is used to prioritize solutions for handling between steps in the algorithm. This allows the algorithm to use information about earlier-discovered solutions when selecting new solutions to be evaluated. In this manner, the optimization algorithm evolves a population of solutions using stochastic processes over many generations or iterations. While primarily discussed in the context of a genetic algorithm, the methods disclosed herein may also be applied to other iterative optimization techniques such as simulated annealing, particle swarm, pattern search, reinforcement learning, and others, where the performance of one set of potential solutions is evaluated to inform determination of a new set of potential solutions for evaluation.

Such approaches can provide further scalability in implementations of the present invention by implementing advanced forms of the objective function that verify the solutions' compliance with behavioral specifications during training. As has been described, during training of AI systems with optimization algorithms, the objective function is configured to provide output that reflects (e.g., scores or evaluates) the behavior of the system (e.g., the problem that is being solved for) in view of a desired goal. Typically, the value of the objective function is a simple value or score that is used to identify favorable individuals in a generation and sometimes to indicate when training is complete. However, in some AI systems, solutions associated with desirable objective function values may still be flawed or unsuitable for their downstream intended purpose.

As an example, many fuzzy logic systems are formally verified across an input space to confirm that the output of the fuzzy logic system is acceptable in all possible scenarios, that is, with all possible inputs. Formal verification is a mathematical process that seeks to prove or disprove whether a system meets—or extent to which the system meets—a set of defined specifications. Thus, a system may be highly scored by an objective function, but it may still fail or perform poorly against formal specifications. In some systems, formal verification is performed using an external tool or separate software application that is configured to abstract the logic of the system into one or more mathematical equations. Once abstracted into a mathematical model, output from the system resulting from inputs across the input space (e.g., the set of all possible inputs, or a subset thereof) is compared to constraints or outputs specified by the formal specification.

While adherence to formal verification may be somewhat predictable with manually configured fuzzy logic systems, there is little predictability with automatically configured fuzzy logic systems such as those used with a GFS or GFT. Where formal verification indicates that such a system does not match or meet the formal specification, this indicates that the system may have evolved to include undesirable logic, even if it returns highly performant results in testing and simulation. In other contexts, the formal specifications may operate as a function of aspects of execution of the subject system rather than (or in addition to) its output, such as peak memory usage, total computing time, range of intermediate computation values, or other aspects as will occur to those skilled in the art.

A typical approach to formally verifying a fuzzy logic system is to rigorously check the system against any behavioral requirements, constraints, or other specifications after the system is fully configured and/or ready for deployment to a production environment. While the processing cost of such formal verification is high, it is ideally only required a handful of times immediately before production so that a handful of manual configurations can address any issues.

For fuzzy logic systems that may have less predictable adherence to formal specifications (e.g., such as those optimized by a genetic algorithm), typical approaches to formal verification are unsuitable. For example, training and optimization to arrive at usable solutions may have a very high processing cost, and if the optimized solutions violate one or more behavioral specifications, the system may have to be retrained to achieve compliance. Further, manual configurations of the optimized system may be difficult or impossible, due to the potential complexity of an automatically generated solution and the lack of familiarity that a human user may have with such solutions. Thus, where a solution must be discarded or retrained, processing cycles spent during training to arrive at that solution may be wasted, which ultimately impacts the scalability of such problem-solving approaches.

Systems disclosed herein may mitigate or prevent such wasted effort by checking solutions' compliance with formal specifications inside of the training/optimization loop rather than verifying the specifications post-optimization. As an example, specification checking may be integrated into and performed as part of the objective function. In this manner, the objective function may provide output that evaluates both the fitness of a particular solution as well as a metric indicating the compliance of the solution with a set of formal specifications. Specification fitness may be based on how many separate specifications are met (that is, a mere count or proportion), the importance of specifications that are or are not satisfied (such as a weighted sum), or other factors (for example, by incorporating the degree of compliance or noncompliance with one or more specifications), and can be used as additional factors for grading or assessing the quality of the solution. Including specification verification in the objective function allows the optimization algorithm to search the solution space for solutions that are both high-performance and also increasingly compliant with specifications. Compliance may be measured in various ways, as will be described in more detail below. As an example, varying specifications may be treated as either hard or soft constraints, such that violation of an important constraint may result in the solution being terminated or being heavily penalized, while violation of other specifications may result in graduated penalties based on the frequency or degree of violation or the overall number of specifications violated.

Formal verification of specifications within the objective function is also advantageous because it allows for the specification to be evaluated across the entirety of the input space. This can be distinguished from evaluation of constraints using only the values encountered in a training set of inputs. By evaluating the specifications across the whole input space, they may provide a conclusive measure of whether (or how well) the FIS meets the specifications and can incorporate that into the learning or training process during the optimization routine. This is possible because formal verification may be performed during evaluation by the objective function.

Since the results of formal verification may be incorporated into training and learning rather than being determined post-optimization, the need for retraining may be mitigated or entirely avoided. For example, where a first individual (solution FIS) in a population solves a problem in 60 seconds but violates one or more formal specifications, and a second individual (solution FIS) in a population solves the problem in 70 seconds without violating any formal specifications, it may be desirable to ensure that the second individual is preserved in the population, or that the first individual is culled from the population, rather than deciding based on raw performance. It may also be desirable to leave both individuals in the population so that an individual in a subsequent generation might benefit from the performance characteristics of the first individual and the compliance characteristics of the second. As another example, where different individuals meet varying numbers of specifications, the optimization algorithm may prioritize individuals (e.g., for retention or reproduction) based on the percentage of specifications met, the importance of specifications met, or other factors. By avoiding or reducing the extent of retraining, there is also a reduced need to define or configure additional expert knowledge or other capabilities into the objective function, which in prior systems might sometimes be performed manually prior to retraining.

While it is advantageous to include behavioral specifications in objective function evaluation, structural and parameter specifications can be checked during optimization as well. The result is that the optimization algorithm enforces another set of constraints on the FIS, but also guarantees that those constraints are met, or at least identifies failures, without outright limiting the operations that occur and intermediate potential solutions that may arise during operation of the optimization algorithm. As constraints can be made to heavily punish performance when generating candidate solutions for the optimization algorithm, this is a way to potentially increase the speed of the search while retaining the ability to enforce arbitrary constraints on the system parameters or characteristics. In practice, this provides a method of introducing soft constraints into the optimization algorithm in order to select solutions that meet some or all of the constraints, or that meet a subset of important or desirable constraints, if possible.

Figure 5:
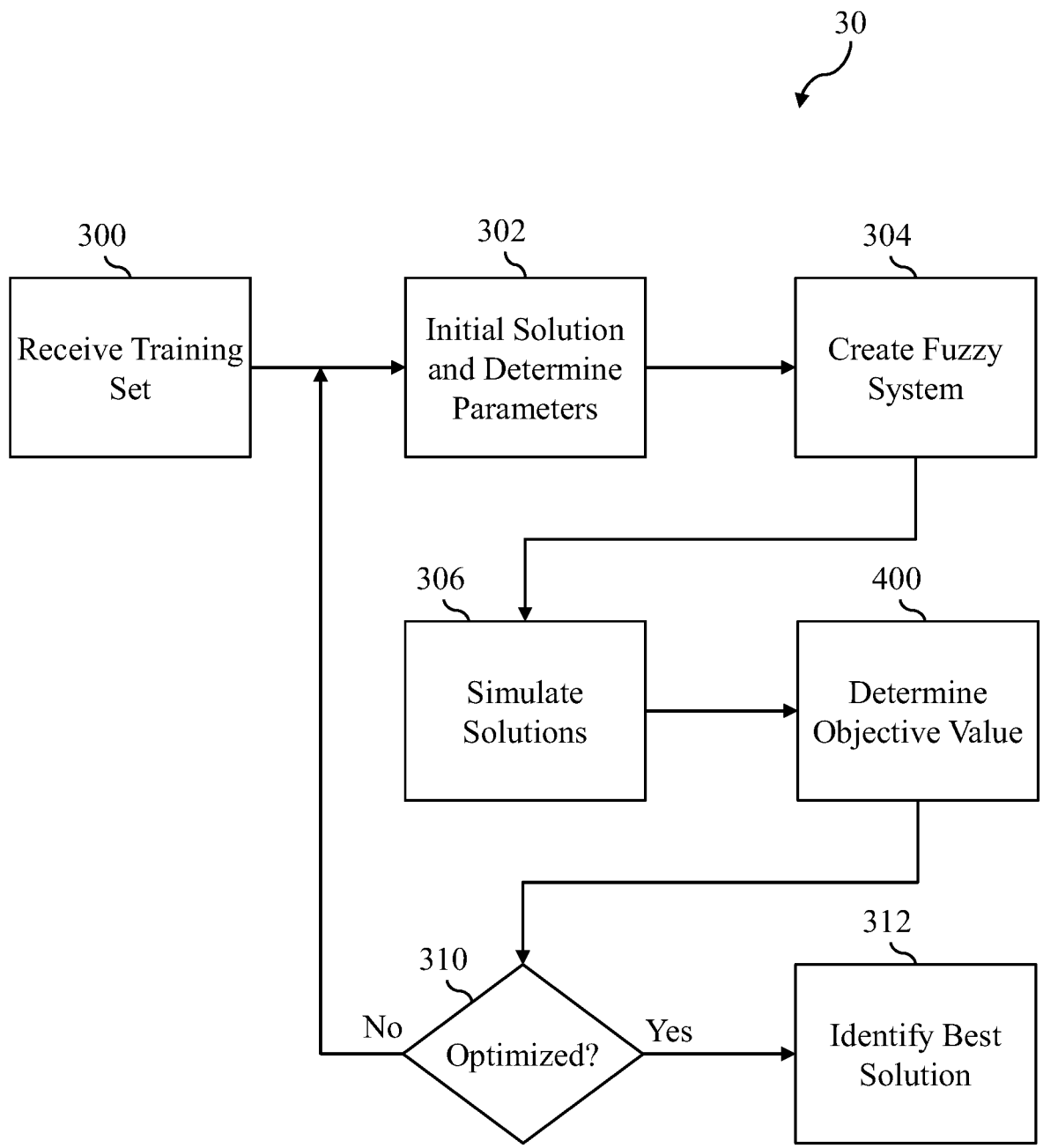
FIG. 5 is a flowchart of an exemplary set of steps that may be performed during execution of an optimization algorithm.
Figure 6:
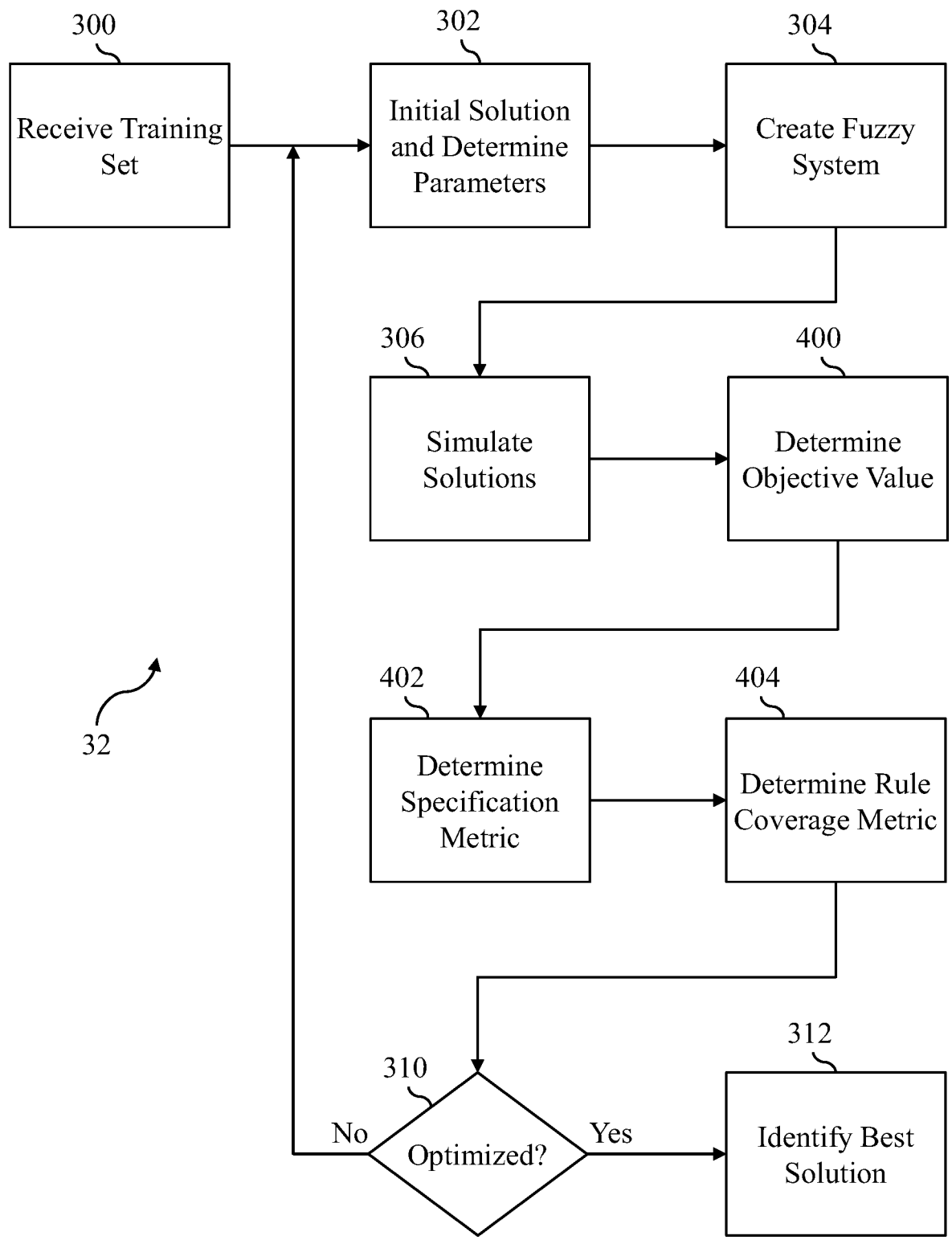
FIG. 6 is a flowchart of an exemplary set of steps that may be performed during execution of an optimization algorithm using an exemplary objective function.

FIGS. 5 and 6 illustrate examples of optimization algorithms. FIG. 5 shows a set of steps of an exemplary iterative optimization algorithm (30) that uses a standard objective function to evaluate various solutions to a computational problem, while FIG. 6 shows a set of steps of an exemplary iterative optimization algorithm (32) that uses an advanced objective function such as that described above.

In the optimization algorithm (30) of FIG. 5, the system identifies (block 300) a training set that includes a variety of possible inputs associated with the problem that is being solved or the system that is to be configured. The system also identifies (block 302) a set of possible solutions ("individuals") to the problem/system and encodes the parameters corresponding to such solution. The system converts the population of solutions into parameters (block 304), and each solution is simulated (block 306) or otherwise provided inputs in order to produce output to be evaluated by the objective function. The initial training set may be automatically generated, manually generated, or a combination of both, as will be apparent to those of ordinary skill in the art in light of this disclosure.

Upon completion of the simulation (block 306), an objective function can be used to determine (block 400) the objective value of each solution, which is the value of the objective function as applied to the identified solution (e.g., as a combination of one or more metrics such as the effectiveness of the solution, the accuracy of the solution, etc.). The determined (block 400) objective value or other termination condition(s) may then be used to determine whether one or more optimized (block 310) individuals have been identified. When optimization is complete (block 310), the optimization algorithm may identify (block 312) the best solution, which may take varying forms. As an example, in some implementations the best solution may be one or more individual solutions that have the highest objective values. In some implementations, the best solution may be identified (block 312) as an FIS that has been trained to produce highly optimized values. Where it is determined that optimization (block 310) is not complete, one or more of the current solutions may be selected and inherited into a new generation that is simulated (block 306) or otherwise provided inputs, and then evaluated (block 400), as has been described.

The optimization algorithm (32) of FIG. 6 is similar to that of FIG. 5, except that an advanced objective function is used. This advanced objective function (40) can be seen isolated in FIG. 7. In particular, the advanced objective function (40) includes a step of determining (block 400) the objective value as described in the context of FIG. 5, but additionally includes steps of determining (block 402) a specification metric and determining (block 404) a rule metric. The specification metric is determined by applying a formal verification process to the solution within the objective function (40) and describes the characteristics of a given solution within the context of one or more formal specifications. As an example, the determined (block 402) specification metric may be a weight value or penalty modifier that may be applied to the objective value, and that is determined based upon the character and extent of compliance and/or noncompliance with certain formal specifications by the solution. As another example, the specification metric may be a distinct value indicating the extent of adherence to the formal specifications. As yet another example, the specification metric may be considered by the optimization algorithm or other subsequent processes or systems as a distinct value from the objective value. As still another example, the specification metric may be a complex value such as an array or other data structure that describes formal specifications that were evaluated as well as the results of such evaluation. The specification metric may take other forms as will be apparent to those of ordinary skill in the art.

Where the underlying system is a FIS, a rule coverage metric for the solution is determined (block 404) by analyzing the extent and scope of rule coverage, that is, how many of the rules in the FIS are used in training and/or how many times. This rule coverage metric provides additional valuable information indicating the adequacy and desirability of particular solutions, and it may also indicate the adequacy of the identified (block 300) training set, as will be described in more detail below (e.g., FIGS. 9-12 and the related discussion).

After the objective function (40) completes, the expanded output (e.g., an objective value weighted based upon metrics, or a separate objective value and metrics set) may be used during optimization (block 310) in various ways. As an example, the expanded objective function output may be used to determine whether optimization (block 310) is complete, such that a set of solutions that returns high objective values and are considered optimized by the optimization algorithm (30) of FIG. 5 might still be non-optimal due to a failure to meet formal specifications (reflected in low specification metrics), a significant proportion of untested FIS rules (reflected in low rule coverage metrics), or both. In such a case, a solution that scores well but fails a number of formal specifications may be further trained and refined to produce new generations of solutions (block 302) instead of identifying (block 312) a best solution that is later determined not to be viable by a formal verification environment and toolset.

The expanded objective function output may also be used when determining optimization (block 310) and evolving new generations of solutions (block 302) to influence the individuals and traits that are passed on to a subsequent iteration of the optimization process. As an example, where the system determines that an additional iteration will be performed (block 310), a subset of individuals from the current generation may be selected to participate in subsequent generations (e.g., by being eligible to produce offspring in the next generation in the context of a GA) so that their traits may be passed on. Such selection may be semi-stochastic while also being influenced by objective function scoring. Thus, an individual that has been penalized or weighted due to specification and rule coverage metrics may be influenced toward or away from participation in subsequent generations.

Similarly, specification and rule coverage metrics may be considered in isolation or in addition to the objective function value. This may cause individuals that score poorly but satisfy all formal specifications to participate in future generations so that the traits that cause them to meet formal specifications have an opportunity to be passed on. The reverse is also true, such that individuals that score well in objective value might be strictly culled from involvement in future generations due to failing a high number of formal specifications, or due to failing certain critical formal specifications.

As described above, it can be seen that specification metrics can influence training outcomes throughout multiple iterations of initial solution determination (block 302) and parameterization. As a result, the optimization algorithm will more quickly converge toward a satisfactory solution (e.g., one that has high objective value and high adherence to formal specifications) without post-optimization retraining, thereby reducing the need for retraining or expert knowledge configuration as a result of issues with post-training formal verification.

Figure 8:
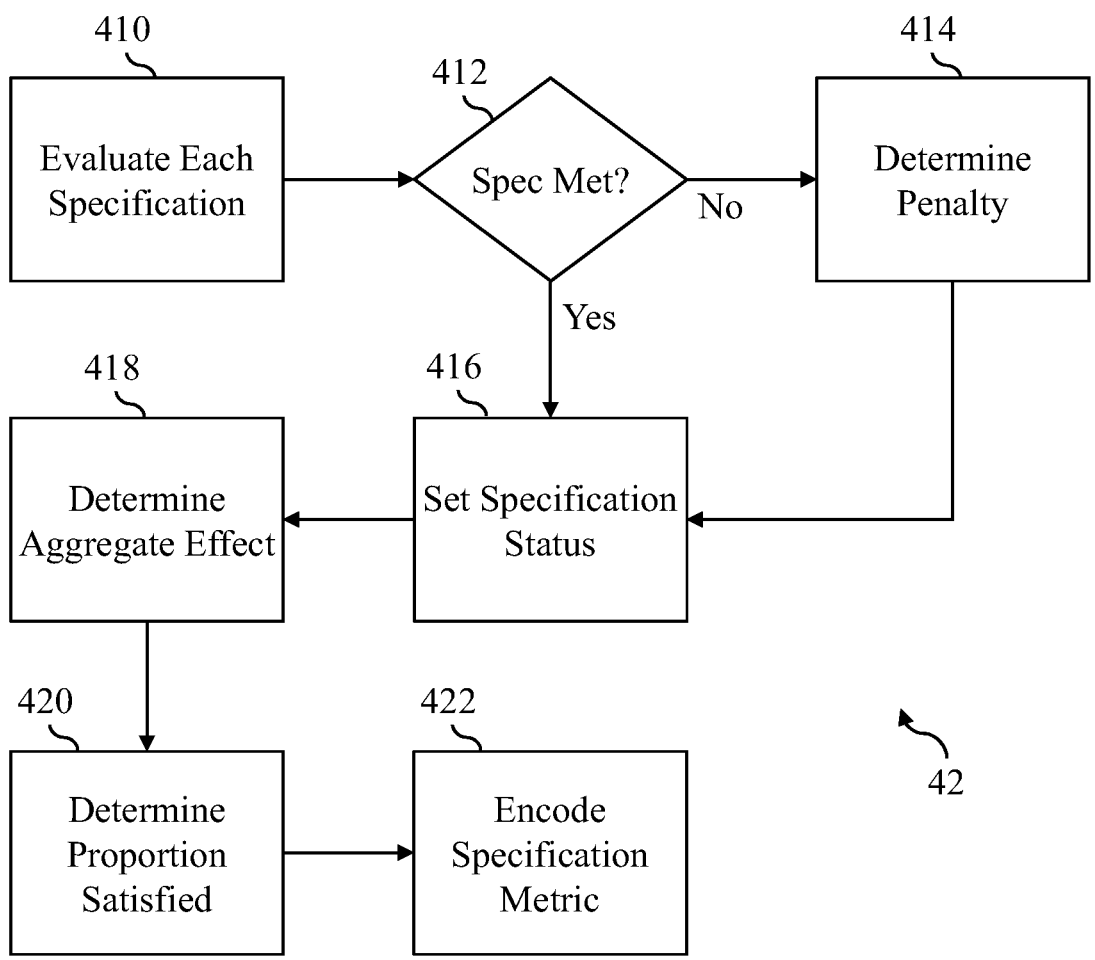
FIG. 8 is a flowchart of an exemplary set of steps that may be performed to determine a specification metric.

While several examples have been provided for determining (block 402) the specification metric, other examples exist. As an example, FIG. 8 shows an exemplary set of steps (42) that may be performed to determine (block 402) a specification metric during evaluation by the objective function. As each potential solution is evaluated by the objective function, each of a set of formal specifications may be used to evaluate (block 410) that solution's compliance with that formal specification. Returning to the example of the knapsack problem, it is possible that the maximum capacity of the knapsack (or each of a plurality of knapsacks) may be defined in a formal specification which, if violated, would result in a particular solution being discarded from the population. As another example, additional inputs may be considered for the knapsack problem such as the amount of waste packaging associated with each object. Such a specification could be used to filter out solutions that result in excessive waste, or could be used to generate a graduated or other variable penalty that applies to the total value of objects in order to strike a balance between value and waste. While evaluation (block 410) of whether each formal specification is met may be performed as described (e.g., comparison of values against defined criteria), it may also be performed using abstracted mathematical models as substitutes for the solution, the specification set, or both, as will be apparent to those of ordinary skill in the art in light of this disclosure.

In some implementations, where evaluation (block 410) of a particular individual and specification determines that the specification is not met (block 412) by the individual, a penalty may be determined (block 414) for the failure and associated with the specification metric for the individual. Penalties associated with failure of an individual to meet a particular specification may include multiplicative, arithmetic, or other negative weighting of objective function values, or strict exclusion from participating in future generations, for example, and may be considered individually (e.g., on a per-individual and per-specification basis) or in the aggregate (e.g., on a per-individual and totality of specification compliance basis).

Where evaluation of a particular individual and specification determines that the specification is met (block 412), or after determining (block 414) a penalty for a failed specification, a status may be set for the specification and individual that describes the outcome of the specification evaluation (e.g., specification met, specification failed, extent of compliance, associated penalty). In some implementations, after each specification has been evaluated against the individual and their status determined (block 416), an aggregate effect of specification verification on the individual may be determined (block 418), which may include negatively or positively weighting the objective value, strictly including or excluding the individual from participation in future generations, or otherwise influencing future iterations based on the specification status.

The flexible weighting described above may be configured in various ways in order to support a desired level of influence that compliance with configured specifications has on the training process. Positive or negative weighting may be configured on a per-specification basis, based on specification groupings or categories. Further, the extent and type of weighting may change after each cycle of the optimization loop, such that the influence of specification compliance increases or decreases in subsequent generations.

As an example of per-specification weighting, each specification may be associated with a weighting individualized for that specification. In an example of an autonomous vehicle control system, a specification that requires all evaluated individuals to avoid collisions with statically positioned objects such as trees or walls might be considered a critical specification. A critical specification may be associated with a negative weight for non-compliance that may reduce the objective value to zero, or reduce it by half, while compliance may increase the objective value by 5-10%. Less essential specifications, such as a specification that requires all evaluated individuals to operate above a certain fuel efficiency level may be associated with more moderate weightings, such that non-compliance may reduce the objective value by 1-5%, while compliance may increase the objective value by 1-5%.

Specifications may also be associated with certain categories, and those categories may be associated with positive or negative weightings. Continuing the above example, all specifications associated with a critical category may heavily punish non-compliance, reward compliance, or both, while specifications associated with a moderate category may provide a more moderate influence, and specifications associated with a non-essential category may provide only small influence. In this case, an individual that violates one critical specification may be negatively weighted to a similar extent as another individual that violates ten or more non-essential specifications. This provides great flexibility and specificity in tailoring specification weighting to influence training towards a desired outcome.

Such an approach also supports generational weighting, where the weighting values associated with one or more specifications or specification categories may change for each generation. Such changes may be global or associated with specifications or categories, and may change linearly, exponentially, or in other ways. As an example, a category of non-essential specifications may be associated with a first weighting value during a first generation of the optimization cycle, and then may be associated with a second weighting value during a second generation of the optimization cycle. The change in weighting values may be configured to increase the influence of the associated specifications, or it may be configured to decrease the influence of the associated specifications. This may be desirable where an administrator may wish to heavily influence the first few generations of an optimization loop toward a specific outcome or type of outcome, but then may wish to decrease that influence once the population has advanced. The opposite may also be desirable in some cases.

In some implementations, an overall proportion of specifications that are met may be determined (block 420), which may be used as the sole basis or in combination with other information to influence future evolution involving the individual. As an example, this could include determining a weighted penalty for objective value based on the proportion of specifications met (e.g., where an individual with score 100 fails 50% of the formal specifications, the score may be reduced to 50), or strictly filtering based on the proportion of specifications met (e.g., where an individual fails 50% of the formal specifications they may be strictly excluded from future generations). Such effects could be the sole basis for influencing that individual, or could be combined with other factors (e.g., determined penalties (block 414), determined aggregate effects (block 418)).

While the discussion of evaluating (block 410) the specifications is directed toward a process of formal verification (e.g., evaluating the specifications across the entire input space), some implementations may additionally or alternatively evaluate only the particular sets of inputs, intermediate values, or other parameters that are encountered during simulation or determination of the objective function. While evaluating only the encountered points may not provide a true formal verification, such evaluation may be completed far more quickly than an evaluation across the entire input space. This type of partial verification may be used to identify at least some inputs within an input space where an individual is not compliant with specifications but may be similar to another individual that is high-performing and specification-compliant. As an example, non-compliance with a specification during formal verification may occur due to values that are at the extreme edge of the input space and may have such a low chance of occurrence in production that they are only theoretically possible. Conversely, non-compliance with a specification during partial verification, based on actual values encountered during the fitness evaluation, may be far more likely to occur. In such a case, applying a more stringent penalty to individuals that fail partial verification on a specification may provide a more targeted way to influence optimization and may allow traits of individuals that show high fitness but are non-compliant (perhaps merely on the edges of the input space) to be maintained within the population.

In any case, after specification evaluation has completed and any net effects on the individual and future generations have been determined, the results and/or effects of the specification evaluation may be encoded and/or quantified (block 422) as a specification metric and provided as output for determining (block 402) the specification metric in FIG. 6. The encoded (block 422) specification metric may take a variety of forms. As an example, the specification metric could be a simple value weighting or bonus/penalty entirely within the steps of FIG. 8 (e.g., as part of one or more of determining (block 418) aggregate effect, determining (block 420) proportion satisfied, etc.). As another example, the specification metric could be a rich dataset describing various aspects of the specification evaluation (e.g., the specification status (block 416) for each evaluation), which could be used by a subsequent process or other system.

As will be apparent to those of ordinary skill in the art in light of this disclosure, the specification metrics and rule coverage metrics described herein may be used to prioritize or reward desirable characteristics of an individual, or may be used to reduce the priority of, punish, or filter undesirable characteristics of an individual. Thus, it should be clear that, for any description or example disclosed herein that refers to punishing, filtering, lowering the priority of, or otherwise negatively impacting an individual based upon including or lacking certain characteristics, the opposite (for example, rewarding, selecting, prioritizing, or boosting the score of the individual) is also contemplated herein, and so those examples or descriptions should not be limited to punishing negative characteristics.

Functioning as described, specification verification as a part of the objective function (40) provides a number of advantages, including the ability to influence training within the optimization loop in order to guide solutions that are both high-value and compliant with specifications to influence future generations so that their potentially favorable traits are prioritized and passed on. The result is more rapid convergence towards highly performing candidate solutions that meet the formal specifications and may be produced from automatic training rather than relying on retraining and manual insertion of expert knowledge into the process.

As will be apparent to those of ordinary skill in the art, the determined specification metric (402) and the objective function (40) may be used in a variety of applications that utilize objective functions and other fitness functions. As an example, variations on the specification metric may be determined and used as part of the high level GFT (101) of FIG. 1 (e.g., running a fitness function (138), creating a new population (150), and altering parameters (156)), as part of the customization steps of FIG. 3 (e.g., as part of diversity FIS (912), learning FIS1 (914), learning FIS2 (916)), or as part of recursive self-optimizing processes such as that shown in FIG. 4 (e.g., evaluating fitness in various subsystems (804, 808, 812)).

III. Objective Function with Rule Base Coverage

Determination (block 404) of a rule coverage metric has been previously referenced as part of the objective function (40). Rule coverage within the context of the advanced objective function (40) refers to an analysis of the extent to which FIS rules defined for a particular individual or solution are encountered during training. Extending the example of the knapsack problem, a more complex version may provide that placing objects in the knapsack requires a certain amount of time for each object, each object has a starting temperature, and the temperature of objects increase steadily over time once they are placed in the knapsack.

Additional rules could be defined as "if-then" rules or other conditional expressions and could influence the extent to which a particular object's value is counted when valuing the solution (e.g., some objects may be high value-low weight under basic conditions, but may be detrimental due to time required to place them in knapsack).

Figure 15A:
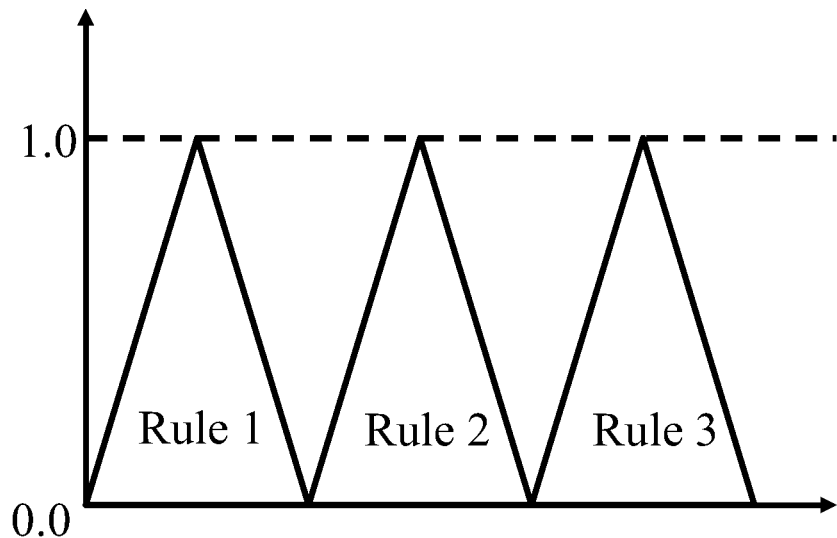
FIGS. 15A and 15B each show examples of triangular membership functions.
Figure 15B:
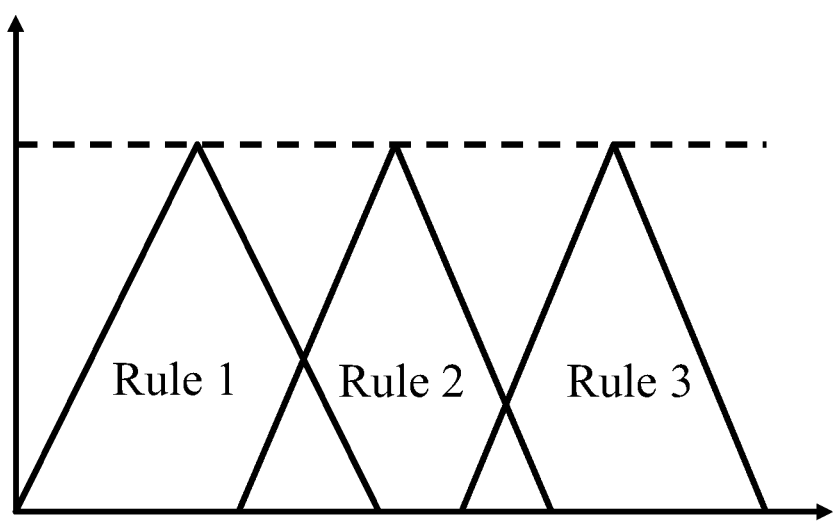

Application of such rules by a fuzzy system may produce output that is varied based upon the extent to which input satisfies a rule condition, rather than a strict Boolean evaluation. This concept may be expressed in a fuzzy system as a membership function, which evaluates inputs against a set of rules and returns a value between 0 and 1 indicating an extent of membership (e.g., satisfaction of condition(s) of the particular rule). For example, different objects might have different values depending on the temperature, so one rule might be for "cool-weather," applying when the temperature is between about 32 and about 60 degrees Fahrenheit." A membership function for this rule may be defined to gradually increase the membership value from 0.0 to 1.0 as temperature rises from 25 degrees to 35 degrees, have a membership value of 1.0 for temperatures from 35 degrees to 60 degrees, and then gradually decrease the membership value from 1.0 to 0.0 as temperature continues to increase from 60 degrees to 70 degrees. A separate "warm-weather" rule might increase its membership function from 0.0 to 1.0 as the temperature increases from 60 degrees to 70 degrees, maintain the 1.0 value from 70 degrees to 85 degrees, then decrease from 1.0 to 0.0 as the temperature rises from 85 degrees to 95 degrees. While a jacket and jeans might have a high value and a swimsuit might have a low value under the "cool-weather" rule, the values might be reversed under the "warm-weather" rule. Additional rules would deal with other temperatures.

Where two or more rules are triggered by an input, rules may be separately applied to input with some weighting to provide a combined result. For example, at 63 degrees, the "cool-weather" rule may have a weight of 0.3, while the "warm-weather" rule would have a weight of 0.7. Where rules are adjacent, in that they may be triggered concurrently, resulting membership functions may have varying shapes (e.g., triangular, trapezoidal, gaussian) and may be distinct or overlapping, as shown in FIGS. 15A and 15B.

In the above context, utilization of rules during training may indicate the extent to which particular rules influence output from the solution. This could include whether the rule is ever triggered (that is, whether any input used in a simulation yields a nonzero membership value), the frequency and duration for which the rule is triggered (e.g., a rule that is triggered only by very high temperatures in a scenario dealing with moderate or low temperatures may be triggered rarely and only for short periods), and the effect that the rule has on output (e.g., a rule may be triggered but may have a fixed membership value for all inputs).

It is generally desirable for solutions to have rules that are utilized and positively impact solutions, as opposed to rules that are never or rarely activated due to insufficient inputs, or that are activated but have little or no influence on output due to being only rarely activated or providing output that is not diverse. This is because if a rule is not evaluated (or is evaluated under an insufficient number or variety of conditions) during the training, the system cannot be said to have "learned" what behavior is desirable under the conditions that trigger that rule. Further, when the learning utilizes an FIS or other structure and is based on a stochastic process (e.g., such as in a genetic fuzzy system), if a mode is not visited during evaluation on the training set, the processes might end up assigning any valid value to FIS parameters without the benefit of any (or sufficient) feedback as to the value's desirability.

As a result, a method of tracking rule coverage within the objective function provides similar advantages to that of specification evaluation within the objective function, in that it provides an additional source of data that may be used to influence the creation and evolution of future generations by prioritizing or de-prioritizing individuals within a population. Analysis of rule coverage is also advantageous in that it can be used to identify deficiencies within the training set, as an incomplete or non-diverse training set may result in desirable and effective rules being underutilized.

By implementing rule coverage analysis, the system can use coverage information to improve performance of the optimization system in several ways. For example, the system can adapt to knowledge that a particular rule is frequently encountered by adapting that rule more (or less) or more (or less) often to take advantage of the rule's impact. A frequently-visited rule might be prioritized to increase its likelihood of inclusion in later generations. The system may also punish or lower the importance or priority of rules that do not contribute to the system's performance, or punish individuals that have rules that are never reached. In other embodiments, knowledge that certain rules are encountered more or less often than others during simulation can be used to influence identification of the input/training set to be used in a subsequent iteration/generation of the optimization method.

Some implementations of the rule coverage metrics described herein enable tracking and measurement of activated rules, and development of a subsequent generation with a constant number of rules, which can prevent undesirable partitioning of the input space a priori.

Figure 7:
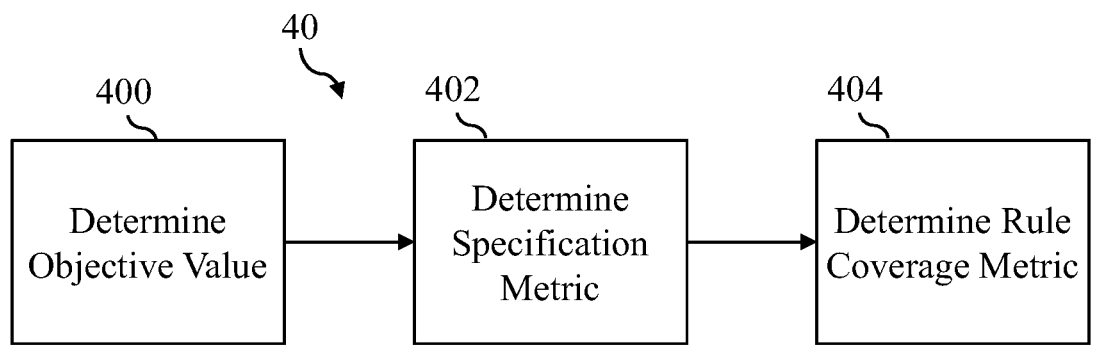
FIG. 7 is a flowchart of an exemplary set of steps of the objective function of FIG. 6.

An objective function such as the objective function (40) of FIG. 7 is advantageous in that it evaluates both rule coverage and specification compliance, two related and complementary characteristics of an individual, and can consider each in the context of each other and in the context of a standard objective value when influencing future generations. In other words, multiple characteristics of the individual can be considered in parallel when evaluating whether an individual participates in creation of future generations, as compared to conventional optimization methods that either disregard some characteristics entirely, or only consider them in sequence (e.g., objective value being considered during optimization, formal specification compliance being considered during post-optimization verification in a separate software application, and rule base coverage being ignored).

With reference to FIGS. 6 and 7, the optimization algorithm may determine (block 404) a rule coverage metric for each individual as part of the objective function (40) within the optimization loop. Varying implementations of the objective function (40) will determine, in addition to the standard objective value, a specification metric, a rule coverage metric, or both. Similar to the specification metric, determination (block 404) of rule coverage metrics may take various forms and may include a penalty or weight value to be applied to an objective value, data to cause the individual to be strictly included or excluded from the process of creating future generations, data describing the overall proportion of rules activated, data describing the frequency and duration of activation of each rule, data describing input and output associated with activated rules, and other characteristics relating to rule coverage.

Figure 9:
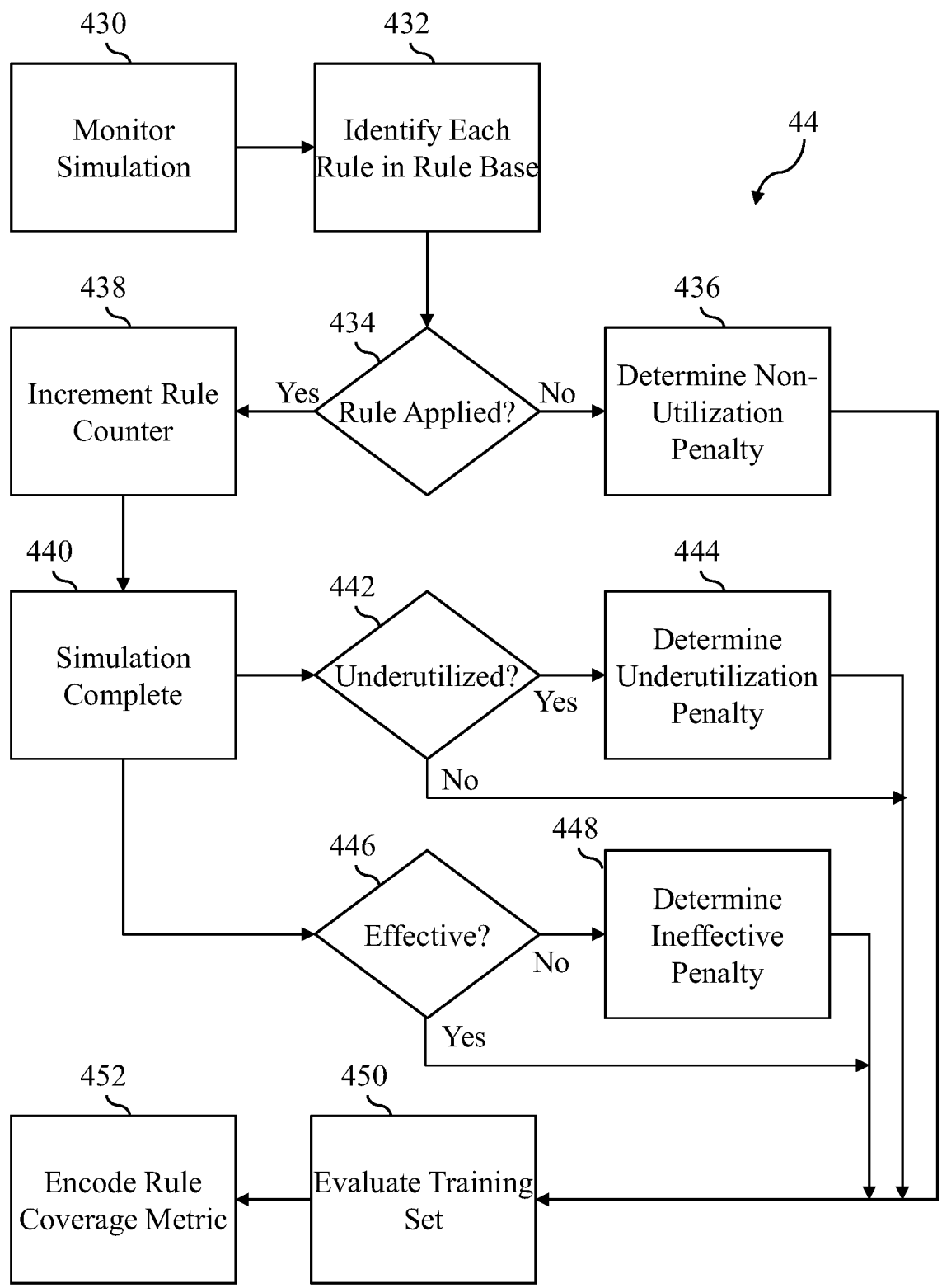
FIG. 9 is a flowchart of an exemplary set of steps that may be performed to determine a rule coverage metric.

FIG. 9 shows one exemplary set of steps (44) that may be performed to determine (block 404) rule coverage metrics. While an individual solution is simulating output for the input scenarios within the training set, the optimization algorithm will monitor (block 430) the simulation and identify (block 432) each rule within the rule base for that individual. Rules may be identified and tracked within a data structure as a multidimensional array, a matrix, or another collection. FIG. 11 illustrates an example (50) of a set of identified (block 432) rules that may be associated with a particular individual within a generation. Each block within the matrix (500) represents a rule (502) that may be executed and applied to help develop output from a solution based on a set of inputs (e.g., 25 rules labeled as rule $U_{1,1}$ through rule $U_{5,5}$). As an example, some rules in this rule base expressed in linguistic form are "If $input_1$ is in range $A_1$ and $input_2$ is in range $B_1$ then output is determined by rule $U_{1,1}$," and "if $input_1$ is in range $A_4$ and $input_2$ is in range $B_3$ then output is determined by rule $U_{4,3}$."

As the individual simulates processing a variety of inputs, the optimization algorithm will continue monitoring (block 430) the logic executed during the simulation and identify when each rule activated (block 434) based on the inputs. If a particular rule is not activated and applied (block 434) to any set of inputs across the training set, a non-utilization penalty may be determined (block 436) and associated with that individual indicating that the rule was not activated. This penalty may be represented as a weight penalty or other modifier that may be applied to the objective value; may be a complex dataset describing the characteristics of the individual, rule, and input set; may be a flag, status indicator, or incrementing counter; or make take other forms as will be apparent to those of ordinary skill in the art in light of this disclosure.

Where a particular rule is activated (block 434), a rule counter may be incremented (block 438) in order to track the frequency and duration of use of the rule across the entire simulation and training set. The system will continue to monitor (block 430) the simulation as described, and, as each iteration of the simulation completes (block 440) and is evaluated by the objective function (40), may perform additional evaluations of rule coverage based on aggregate results of the simulation across the training set. This may include determining whether particular rules that are applied are underutilized (block 442) based on the incremented (block 438) rule counter. This determination is useful because there may be little effective difference, for the purpose of rule coverage, between a rule that is never applied during simulation using thousands of input values and a rule that is only applied a handful of times during simulation with thousands of input values.

Where a rule is determined to be underutilized (block 442), which may be based on a proportional threshold of application (e.g., a rule that is activated by less than 10% of input values across the training set may be considered underutilized), an absolute threshold of application (e.g., a rule activated fewer than a certain number of times), or other technique as will occur to those skilled in the art in view of this disclosure, an underutilization penalty may be determined (block 444), which may be a weight penalty applied to an objective value, a simple flag or status indicating underutilization, or a complete dataset describing various characteristics leading to a conclusion of underutilization.

FIG. 12 illustrates an example (52) of tracked rule utilization and is based on the example (50) of FIG. 11. Rules are represented as labeled blocked within the matrix (500) and are shaded along a gradient to indicate their utilization based on the training set. For example, a rule $U_{5,5}$ (504) has no shading and may indicate a rule that was never activated or applied during simulation. A rule $U_{5,1}$ (506) is lightly shaded, indicating activation but low utilization (e.g., between about 1% and about 10% utilization). A rule $U_{4,1}$ (508) is shaded slightly darker and may indicate moderate-low utilization (e.g., between about 10% and about 30% utilization). A rule $U_{2,1}$ is shaded slightly darker and may indicate moderate utilization (e.g., between about 30% and about 50% utilization). A rule $U_{3,2}$ is darkly shaded and may indicate high utilization (e.g., between about 50% and about 100% utilization).

Data such as that illustrated in the example (52) of FIG. 12 may be used to determine whether rules are non-utilized or underutilized, and may also be used to determine (blocks 436, 444) any associated penalties, data, or other actions based on such non-utilization or underutilization. As an example, data such as that illustrated in the example (52) may be used to determine penalty values to be applied to objective values, or may be provided as a data structure or dataset as part of a complex rule coverage metric. As with prior examples, penalties or other actions taken to influence future generations may include graduated penalties (e.g., a variable penalty based on the entirety of the data of the example (52)) or may be strict exclusion or inclusion from future generations based on certain criteria (e.g., non-utilized rules exceeding a threshold, underutilized rule exceeding a threshold, an average of 50% or less utilization of all rules, etc.).

In addition to determining underutilization (block 442), the optimization algorithm may also determine whether the rules are effective (block 446) in that their application influences the output and results in a diverse set of outcomes. As an example, where a particular rule returns a constant value and applies across all inputs, the rule may be ineffective despite being activated. As another example, the diversity of results from the rule may be tracked and analyzed to identify rules that primarily or only provide the same result (e.g., a rule that primarily returns a value of "100" regardless of input differences). Where a rule is meant to modify an input value, the diversity of results from the rule may be tracked and analyzed to identify rules that primarily or only provide unmodified results (e.g., where the input value is "100" and the returned value is also "100"). Other examples of scenarios where rules may be ineffective exist and will be apparent to those of ordinary skill in the art in light of this disclosure.

When ineffective rules are identified, the optimization algorithm may determine (block 448) an ineffective rule penalty to be applied or added to the rule coverage metric. As with prior examples, penalties or other actions taken to influence future generations may include graduated penalties (e.g., a variable penalty based on a proportion of ineffective rules) or may be strict exclusion from or inclusion in the process of producing future generations based on certain criteria (e.g., where the proportion of ineffective rules exceeds a threshold).

While one goal of analyzing rule coverage is to identify individuals that have non-utilized, underutilized, or ineffective rules or, alternatively, identifying individuals that have highly utilized and effective rules, such data may also be used to identify deficiencies in the training set that is provided to the optimization algorithm. While the result of determining and utilizing the rule coverage metric (block 404) will commonly include prioritization or filtering of individuals in order to improve the efficiency and outcomes of optimization, it may also commonly result in the modification and improvement of training sets within the optimization loop. This is advantageous in that it provides an additional opportunity to direct training and optimization towards an optimal result within the optimization loop, rather than only determining that the training set was deficient after training is complete, or after formal verification identifies a number of specification violations that may be caused by the deficient training set.

To leverage this advantage, the system may evaluate (block 450) the training set where any determined (block 436, 444, 448) penalties or other undesirable rule activities are identified. As a result of such evaluation (block 450), the system may modify the training set, modify the determined (block 436, 444, 448) penalty data prior to inclusion in the rule coverage metric, or take no action. Whether or not any action is taken based on the evaluation (block 450), the system may complete the determination of the rule coverage metric (block 404) by encoding (block 452) the resulting data, penalties, or other determinations into a rule coverage metric. This encoding may vary based upon the determinations and results of rule coverage analysis, and may include simple weight penalties to be applied to an objective value, values representative of proportional rule coverage, or complex data structures describing various characteristics of the already completed analysis that may be used by subsequent processes or systems.

Figure 10:
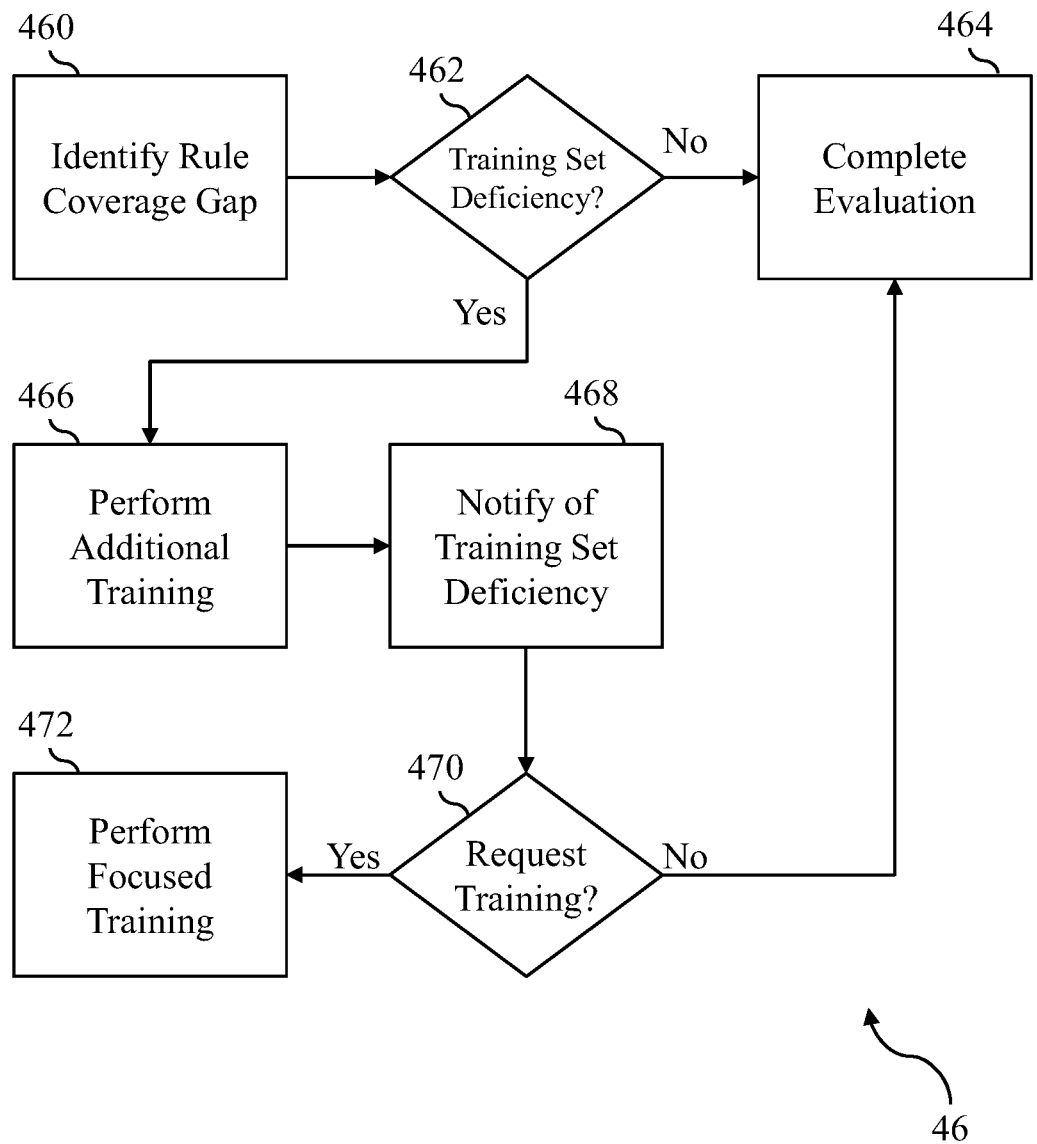
FIG. 10 is a flowchart of an exemplary set of steps that may be performed to evaluate a training set during optimization.

FIG. 10 shows one exemplary set of steps (46) that may be performed during evaluation (block 450) of a training set. During evaluation (block 450), the system may identify (block 460) a rule coverage gap based upon the prior results of rule coverage analysis. The rule coverage gap may be a set of one or more rules that were previously identified as non-utilized, underutilized, or ineffective, and may be isolated from the workflow of the individual solution such that the inputs or application triggers can be directly controlled and the outputs directly analyzed without running a full simulation. With the rule coverage gap identified (block 460), the system may determine (block 462) whether there is a training set deficiency by testing and identifying the inputs that would result in the rules of the rule coverage gap being normally utilized and effective. Such inputs may need to be traced backwards through other portions of the individual solution or rule base in order to identify the inputs that, were they present within the training set, would result in desired application of the rules within the rule coverage gap.

Once the missing training inputs have been identified, they may be compared to the training set to determine whether those inputs could have been or should have been included in the training set, in the case that the training set is automatically generated by another process or software application, or whether those inputs have been expressly omitted from the training set, in the case that the training set is manually configured or designed, or that restrictions have been expressly configured for the training set to prevent or omit certain inputs. In cases where there is no reason to suspect a training set deficiency (block 462) (e.g., due to express omission or other acceptable causes), the system may complete (block 464) the training set evaluation (block 450) and proceed with encoding (block 452) and returning the rule coverage metric.

Where one or more classes of inputs have been identified as having been omitted from the training set without an express configuration or direction, it may be determined that the inputs have been omitted due to randomness or context-blind automated processes, and that their inclusion in the training set may improve the training and optimization algorithm. In such a case, the system may determine that the training set is potentially deficient (block 462), and may update the training set to include one or more instances of the omitted input so that additional training (block 466) may be performed using the updated training set. This may include, for example, continuing the optimization loop from the present iteration with the new training set, forcing the optimization loop to continue for at least one more iteration from the present iteration, or reversing and continuing the optimization loop from a prior iteration.

In some implementations, instead of or in addition to performing additional training (block 466) automatically, the system may notify (block 468) one or more administrators or other users of the training set deficiency by sending an electronic communication describing the current status of training, the nature of the underutilized or ineffective rule, the nature of the missing input, any indications that the missing input was intentionally or randomly omitted from the training set, and other additional context that may assist the recipient in determining whether the missing input should be added to the training set.

As an example, with reference to the knapsack problem, where it is determined that the training set does not include input that can result in the weight of objects within the knapsack exceeding the maximum weight of the knapsack (e.g., the number of objects or the aggregate weight of all objects is too low, or the knapsack maximum capacity is too high, or both), there may be critical aspects of potential solutions that are not being valued by the objective function or otherwise tested. In such a case, the system may provide a notification to an administrator of the system that describes the rule that is not applied (e.g., "cool-weather rule not tested") and the nature of input that would result in the rule being applied (e.g., introducing temperature scenarios in the relevant range, introducing objects particularly suitable for cool weather, introducing objects to particularly ill-suited for cool weather).

In such a case, the system may expect to receive a response from the recipient in the form of a request for the system to perform additional training (block 472) with an increased focus on incorporating the omitted inputs from the training set in order to utilize those rules within the rule coverage gap, or perhaps to complete (block 464) the evaluation and proceed to encoding (block 452) the rule coverage metric. In implementations that include both, focused training (block 472) that is prompted by manual intervention of an administrator or other user of the system may differ from incidental additional training (block 466) in varying ways. For example, focused training (block 472) may incorporate additional, automatically or manually generated instances of the missing input into the training set, may require some minimum number of additional iterations before being considered optimized (block 310) (e.g., optimization must continue with the updated training set for at least five subsequent generations), or may reverse some number of prior iterations before continuing optimization.

Where the response to the system from the recipient is to ignore the missing inputs rather than to focus on them with additional training, the system may complete (block 464) the evaluation by removing the previously omitted inputs from the updated training set, reversing any additional incidental training that was performed (block 466).

IV. Optimization with Advanced Objective Function

An evaluation of optimization (block 310) for the optimization algorithm (30) of FIG. 5 will typically be fairly simple, as the only criteria being evaluated is the previously determined objective value (block 400), the number of iterations/generations performed, or other straightforward criterion as will occur to those skilled in the art. For the optimization algorithm (32) of FIG. 6, optimization (block 310) may include additional steps prior to a determination of whether to terminate optimization, and may include additional steps prior to the optimization loop advancing to a subsequent iteration (block 302).

Figure 13:
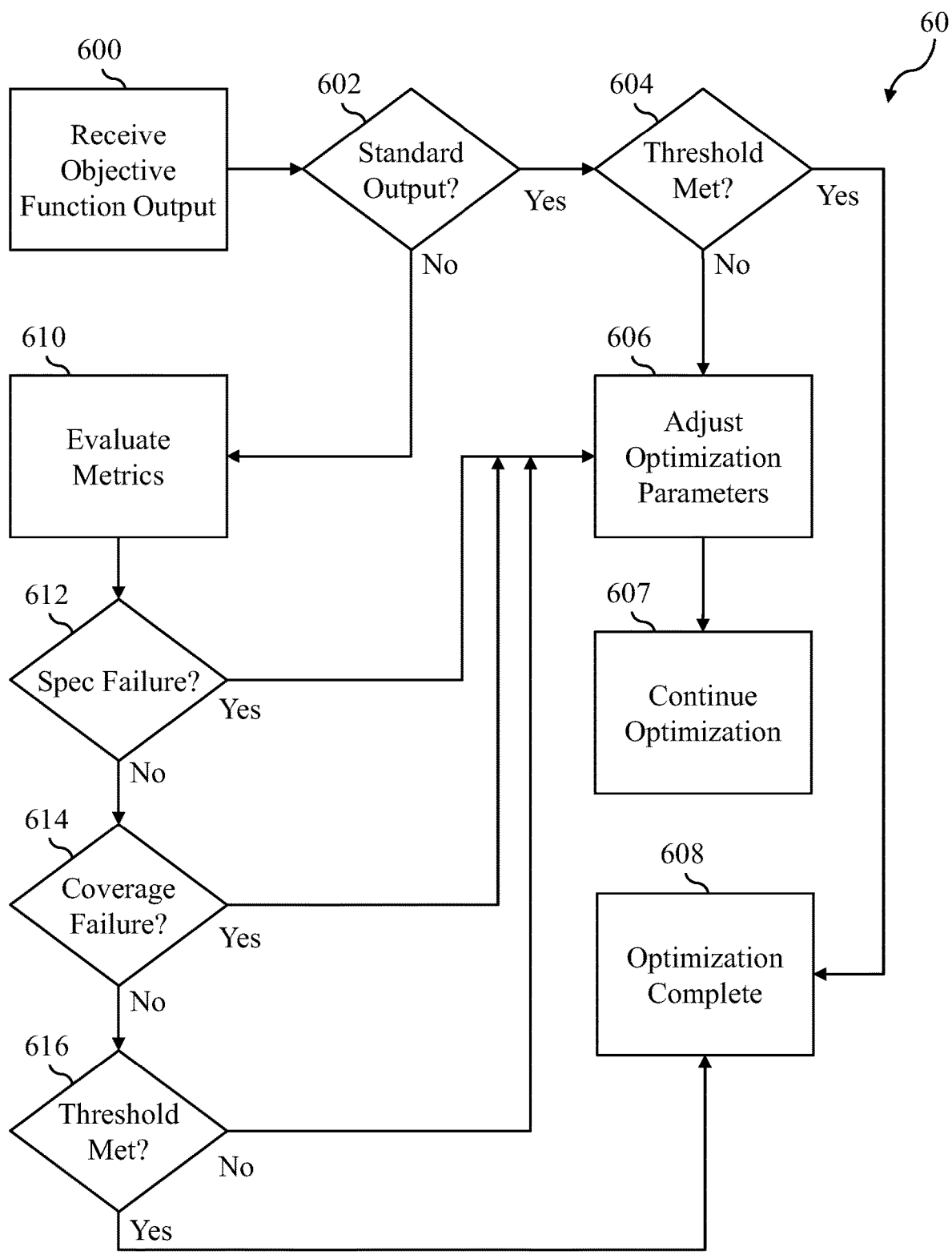
FIG. 13 is a flowchart of an exemplary set of steps that may be performed to evaluate optimization.

FIG. 13 shows one exemplary set of steps (60) that may be performed during optimization (block 310) when the termination decision is a function of the results of the objective function. In such a case, when the evaluation objective function completes, such as the advanced objective function (40), the objective function output is received (block 600) by the system. Where the output is a scalar (block 602) (e.g., simple scoring or valuation metrics), the output will be evaluated against configured optimization parameters to determine whether a minimum optimization threshold has been met (block 604). Where the threshold has been met (block 604), the optimization is complete (block 608), and the optimization algorithm may identify (block 312) the best solution or solutions and then exit the optimization loop. Where the threshold has not yet been met (block 604), one or more parameters of optimization may be adjusted (block 606) prior to continuing (block 607) the optimization loop by determining the training set (set of inputs) and potential solutions for a new iteration or generation. Such parameter changes may occur as described in the step of altering (156) parameters in FIG. 1.

Where the output is determined (block 602) to be non-standard, such as where the objective value is paired with or has been altered by a specification metric, rule coverage metric, or both, the additional available information may be considered in a more targeted way in order to improve future training efforts as has been described. This may include evaluating (block 610) the additional metrics, which may include examining or decoding the metrics where they are provided as discrete data structures or datasets, or examining the objective value and any associated metrics to understand the influence that the specification metric, rule coverage metric, or both had on the objective value.

With additional metrics and information available, the system may analyze the metrics to determine the presence and extent of any specification deficiencies (block 612), any rule coverage deficiencies (block 614), or both. For example, where the evaluated (block 610) metrics do not indicate any deficiencies (block 612, 614), the system may evaluate the objective value against a threshold (block 616) to determine whether optimization has been reached, and then may complete optimization (block 608) or continue optimization (block 606, 607) as may be warranted.

Where the evaluated (block 610) metrics indicate a specification deficiency, such as where the specification metrics for one or more solutions indicate failures of one or more formal specifications, the system may adjust the optimization parameters for a subsequent iteration based on the specification metric and then continue (block 607) the optimization. Additionally or alternatively, where the evaluated (block 610) metrics indicate a rule coverage deficiency, such as where rule coverage for one or more solutions indicate poor rule coverage, the system may adjust the training set (inputs) and/or the optimization parameters for a subsequent iteration based on the rule coverage metric and then continue (block 607) the optimization.

Parameter adjustment (block 606) based on specification metrics, rule coverage metrics, or both is a point where the optimization algorithm may take specific actions to influence future generations or iterations of the optimization algorithm. Parameter changes may include alterations (156) such as those described in the context of FIG. 1, but may additionally include increasing or decreasing the likelihood of specific individuals participating in the creation of future generations, expressly including or excluding specific individuals from participating in future generations, updating training sets in response to poor rule coverage for one or more individuals, and other changes. Once parameters have been adjusted (block 606) in a targeted manner based on the evaluated (block 610) metrics, optimization may continue (block 607) with the new parameters such that solutions in subsequent generations will exhibit improved specification adherence, improved rule coverage, or both, and may additionally converge to an optimal solution more rapidly and with less risk of requiring future retraining.

As has been described, the optimization techniques described herein and variations of such may be used, for example, to enhance the training and optimization of recursive and self-training GFTs such as that shown in FIG. 4. As an example, where each subsystem (804, 808, 812) evaluates fitness, an opportunity exists to implement the objective function (40) in order to factor specification metrics and rule coverage metrics into that evaluation and any subsequent influence on a particular subsystem's production of optimized solutions.

V. Exemplary System

Figure 14:
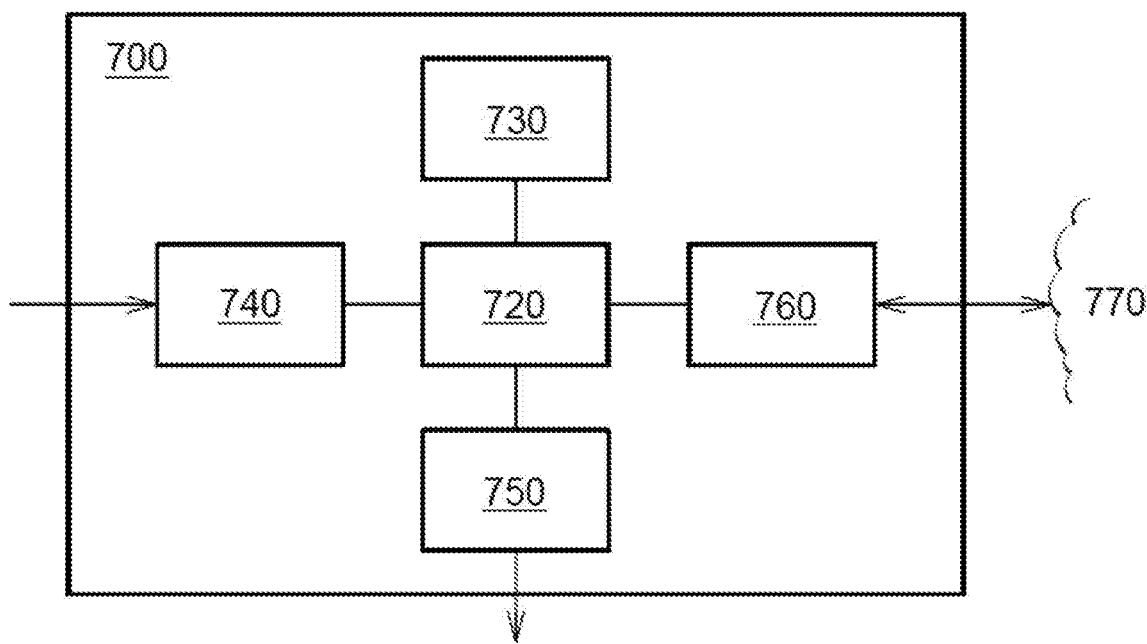
FIG. 14 is a schematic diagram of an exemplary computing system usable during optimization.

In some embodiments of the systems described herein, the computing resources/devices that are applied generally take the form of a mobile, laptop, desktop, or server-type computer, as mentioned above and as will occur to those skilled in the art. With reference to FIG. 14, the "computer" (700) (as this example will generically be referred to) includes a processor (720) in communication with a memory (730), optional input interface(s) (740), optional output interface(s) (750), and optional network interface (760). Memory (730) stores a variety of data, but is also encoded with programming instructions executable to perform the functions described herein. Power, ground, clock, and other signals and circuitry (not shown) are used as appropriate as will be understood and easily implemented by those skilled in the art.

The network interface (760) connects the computer (700) to a data network (770) for communication of data between the computer (700) and other devices attached to the network (770). Input interface(s) (740) manage communication between the processor (720) and one or more touch screens, sensors, pushbuttons, UARTs, IR and/or RF receivers or transceivers, decoders, or other devices, as well as traditional keyboard and mouse devices. Output interface(s) (750) provide signals to one or more output devices (not shown) such as one or more touch screens, LEDs, LCDs, or audio output devices, local multimedia devices, local notification devices, or a combination of these and other output devices and techniques as will occur to those skilled in the art.

The processor (720) in some embodiments is a microcontroller or general purpose microprocessor that reads its program from the memory (730). The processor (720) may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement, such as one or more XENON or $6^{th}$ Gen INTEL CORE i3, i5, or i7 processors from INTEL Corporation of 2200 Mission College Boulevard, Santa Clara, Calif. 95054, USA, or FX, Athlon X4, RYZEN, or A-Series processors from Advanced Micro Devices, One AMD Place, Sunnyvale, Calif. 94088, USA, while in others nontraditional or innovative data processing technology is used. In alternative embodiments, one or more reduced instruction set computer (RISC) processors, graphics processing units (GPU), application-specific integrated circuits (ASICs), general-purpose microprocessors, programmable logic arrays, or other devices may be used alone or in combinations as will occur to those skilled in the art.

Likewise, the memory (730) in various embodiments includes one or more types such as solid-state electronic memory, magnetic memory, or optical memory, just to name a few. By way of non-limiting example, the memory (730) can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

Computer programs implementing the methods described herein will commonly be stored and/or distributed either on a physical distribution medium such as CD-ROM or pluggable memory module (for example, a flash memory device with a USB interface), or via a network distribution medium such as an internet protocol and/or cellular data network, using other media, or through some combination of such distribution media. From there, they will in some embodiments be copied to a hard disk, non-volatile memory, or a similar intermediate storage medium. When the programs are to be run, they are loaded either from their distribution medium or their intermediate storage medium into the execution memory of the computer, configuring the computer to act in accordance with the methods described herein. All of these operations are well known to those skilled in the art of computer systems.

The term "computer-readable medium" herein encompasses non-transitory distribution media, intermediate storage media, execution memory of a computer, and any other medium or device capable of storing a computer program implementing a method for later reading by a computer.

VI. Explicit Definitions

When used in the claims, "based on" and "as a function of" should be understood to mean that something is determined at least in part by the thing that it is indicated as being "based on." When something is completely determined by a thing, it will be described as being "based exclusively on" the thing.

When used in the claims, "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims in the context of configuring a computer or other computing system, "configure" should be understood to mean providing a computer with specific data (which may include instructions) that can be used in performing the specific acts the computer is being "configured" to do. For example, installing MICROSOFT WORD on a computer "configures" that computer to function as a word processor, which it does using the instructions for MICROSOFT WORD in combination with other inputs, such as an operating system, and various peripherals (e.g., a keyboard, monitor, etc.).

When used in the claims or a definition, "data" should be understood to mean information which is represented in a form that is capable of being processed, stored, and/or transmitted.

When used in the claims, "determine" should be understood to mean the act of generating, receiving, selecting, or otherwise specifying something or identifying or accepting it as a thing. A step of "determining", a processor configured to "determine," and other determinations should be understood to include, for example, calculating the results of a mathematical function or mathematical evaluation, accepting one or more function or method parameters, obtaining the results of a function call, obtaining the results of a database query, calculating the results of a Boolean or other logical statement, as well as other examples as will be apparent to one of ordinary skill in the art in light of this disclosure.

When used in the claims, "processor" should be understood to mean a device or group of devices which is capable of performing one or more logical and/or physical operations on data to produce a result. Such devices may or may not be housed in a single unit and, where separate, may or may not be directly connected to or be in communication with each other.

All publications, other applications, and other documents cited herein are hereby incorporated by reference in their entirety as if each had been individually incorporated by reference and fully set forth. While exemplary systems have been illustrated and described in detail in the drawings and foregoing description, the same is to be considered as illustrative and not restrictive in character, it being understood that only certain preferred embodiments have been shown and described and that all changes and modifications that come within the spirit of the invention are desired to be protected.

The invention claimed is:

1. A computing system for optimizing a functional system over an input domain, the computing system comprising a processor and a memory, wherein the processor is configured to:
    determine an initial training set comprising a plurality of inputs from the input domain;
    determine a solution characterizing a configuration of the functional system;
    perform an iterative optimization loop using the processor, wherein the processor is configured to, when performing the optimization loop:
        determine an output of numerical evaluation of the functional system, configured using the solution, as applied to each input in the plurality of inputs to generate an output;
        apply an objective function to the solution to produce an objective value, where the objective function is a function of (i) the output for the solution, and (ii) at least one of (a) a quantification of a degree of compliance of the solution with one or more formal specifications, and (b) coverage of a fuzzy logic rule base during the numerical evaluation; and
        continue the optimization loop as a function of the objective value, wherein the continuation of the optimization loop:
            favors the solution where the quantification of the degree of compliance indicates compliance with more than a first configured proportion of the formal specifications, and
            disfavors the solution where the quantification of the degree of compliance indicates compliance with less than the first configured proportion of the formal specifications.

2. The system of claim 1, wherein the formal specifications comprise one or more behavioral specifications, structural specifications, or parameter specifications.

3. The system of claim 1, wherein the quantification of the degree of compliance of the solution with the one or more formal specifications affects the value of the objective function for the solution based upon a proportion of the formal specifications violated by the solution.

4. The system of claim 1, wherein the quantification of the degree of compliance of the solution with the one or more formal specifications affects the value of the objective function for the solution as a function of weightings associated with each of the one or more formal specifications.

5. The system of claim 4, wherein the processor is configured to modify the weightings associated with each of the one or more formal specifications after at least one cycle of the optimization loop.

6. The system of claim 4, wherein the quantification of the degree of compliance of the solution with one or more formal specifications is configured to perform a partial verification of the one or more formal specifications that is based upon the inputs encountered during application of the objective function.

7. The system of claim 1, wherein the functional system, when configured with the solution, comprises a fuzzy logic controller using the fuzzy logic rule base, wherein the fuzzy logic rule base comprises a set of fuzzy logic rules, and the fuzzy logic rules in the set of fuzzy logic rules are determined as a function of the solution, and the processor is further configured to:
    monitor the operation of the functional system configured according to the solution and generate a rule coverage dataset based on activation of the fuzzy logic rules during that operation; and
    determine the coverage of the fuzzy logic rule base during the numerical evaluation based on the rule coverage dataset.

8. The system of claim 7, wherein the objective function applied to the solution is a function of whether the determined coverage for the solution indicates that one or more rules in the set of fuzzy logic rules are not activated during the numerical evaluation.

9. The system of claim 7, wherein the objective function applied to the solution is a function of whether the determined coverage for the solution indicates that one or more rules in the set of fuzzy logic rules are activated but underutilized during simulation of the solution.

10. A method for optimizing a functional system over an input domain, comprising:
    determining an initial training set comprising a plurality of inputs from the input domain;
    determining a solution characterizing a configuration of the functional system;
    performing an iterative optimization loop, comprising:
        numerically evaluate the functional system, configured using the solution, as applied to each input in the plurality of inputs to generate an output;
        applying an objective function to the solution to produce an objective value, where the objective function is a function of (i) the output of the numerical evaluation, and (ii) at least one additional metric comprising at least one of (a) a quantification of a degree of compliance of the solution with one or more formal specifications, and (b) a quantification of coverage of a fuzzy logic rule base during the numerical evaluation; and
        continuing the optimization loop as a function of the objective value, wherein the continuation of the optimization loop:
            favors the solution where the quantification of the degree of compliance indicates compliance with more than a first configured proportion of the formal specifications, and
            disfavors the solution where the quantification of the degree of compliance indicates compliance with less than the first configured proportion of the formal specifications.

11. The method of claim 10, wherein the formal specifications comprise one or more behavioral specifications, structural specifications, or parameter specifications.

12. The method of claim 10, wherein the quantification of the compliance of the solution with the one or more formal specifications affects the value of the objective function for the solution based upon a proportion of the formal specifications violated by the solution.

13. The method of claim 10, wherein the functional system, when configured with the solution comprises a fuzzy logic controller using the fuzzy logic rule base, wherein the fuzzy logic rule base comprises a set of fuzzy logic rules, and the fuzzy logic rules in the set of fuzzy logic rules are determined as a function of the solution, and the iterative optimization loop further comprises:
    monitor operation of the functional system configured according to the solution and generate a rule coverage dataset based on the activation of the fuzzy logic rules; and
    determine, based on the rule coverage dataset, the coverage of the fuzzy logic rule base during the operation of the functional system configured according to the solution.

14. The method of claim 13, wherein the objective function applied to the solution is a function of whether the determined coverage for the solution indicates that one or more rules in the set of fuzzy logic rules are not activated during the operation of the functional system configured according to the solution.

15. The method of claim 13, wherein the objective function applied to the solution is a function of whether the determined coverage for the solution indicates that one or more rules in the set of fuzzy logic rules are activated but underutilized during the operation of the functional system configured according to the solution.

16. The method of claim 10, wherein the at least one additional metric comprises:
    the quantification of the degree of compliance of the solution with one or more formal specifications, and
    the quantification of coverage of the fuzzy logic rule base during the numerical evaluation.

17. A method for executing an optimization algorithm on a computational system, comprising:
    receiving a training set; and
    performing an optimization loop comprising:
        producing an output from the computational system as a function of a solution;
        monitoring the producing of the output from the solution and generating a rule coverage dataset based on the activation of each rule of the set of rules while producing the output;
        evaluating an objective function over the output produced from the solution to produce an objective value, wherein evaluating the objective function comprises:
            calculating an objective value for the solution;
            determining a specification metric and a rule coverage metric for the solution; and
            generating an evaluation for the solution based on the objective value, the specification metric, and the rule coverage metric; and
        continuing the optimization loop as a function of the objective value;
    wherein determining the specification metric for the solution comprises:
        determining a set of specifications associated with the computational system, wherein the set of specifications comprises one or more behavioral specifications, structural specifications, or parameter specifications;
        evaluating the solution with the set of specifications to (1) determine whether the solution violates one or more specifications of the set of specifications and (2) create a specification status dataset; and
        determining the specification metric based on the specification status dataset; and
    wherein determining the rule coverage metric for the solution is based on the rule coverage dataset for the solution.

* * * * *